United States Patent
Vickrey et al.

(10) Patent No.: US 8,874,523 B2
(45) Date of Patent: Oct. 28, 2014

(54) METHOD AND SYSTEM FOR PROVIDING EFFICIENT ACCESS TO A TAPE STORAGE SYSTEM

(75) Inventors: Rebekah C. Vickrey, Mountain View, CA (US); Frank C. Dachille, Mountain View, CA (US); Stefan V. Gheorghita, Zurich (CH); Yonatan Zunger, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/023,498

(22) Filed: Feb. 8, 2011

(65) Prior Publication Data

US 2011/0196829 A1 Aug. 11, 2011

Related U.S. Application Data

(60) Provisional application No. 61/302,909, filed on Feb. 9, 2010.

(51) Int. Cl.
*G06F 7/00* (2006.01)
*G06F 17/00* (2006.01)
*G06F 17/30* (2006.01)

(52) U.S. Cl.
CPC .............................. *G06F 17/30581* (2013.01)
USPC .......................... 707/652; 707/640; 707/654

(58) Field of Classification Search
None
See application file for complete search history.

(56) References Cited

U.S. PATENT DOCUMENTS

| | | | |
|---|---|---|---|
| 5,781,912 A | 7/1998 | Demers et al. | |
| 5,812,773 A | 9/1998 | Norin | |
| 5,829,046 A * | 10/1998 | Tzelnic et al. | 711/162 |
| 6,167,427 A | 12/2000 | Rabinovich et al. | |
| 6,189,011 B1 | 2/2001 | Lim et al. | |
| 6,226,650 B1 | 5/2001 | Mahajan et al. | |
| 6,263,364 B1 | 7/2001 | Najork et al. | |
| 6,385,699 B1 | 5/2002 | Bozman et al. | |
| 6,591,351 B1 | 7/2003 | Urabe et al. | |

(Continued)

FOREIGN PATENT DOCUMENTS

EP 1 860 542 A2 11/2007

OTHER PUBLICATIONS

Google Inc., PCT/US2011/024246, Feb. 9, 2011, International Search Report and Written Opinion mailed Apr. 26, 2011, 9 pgs.

(Continued)

*Primary Examiner* — Fred I Ehichioya
*Assistant Examiner* — Jau-Shya Meng
(74) *Attorney, Agent, or Firm* — Morgan, Lewis & Bockius LLP

(57) ABSTRACT

A method for asynchronously replicating data onto a tape medium is implemented at one or more server computers associated with a distributed storage system and connected to a tape storage system. Upon receiving a first request from a client for storing an object within the tape storage system, a server computer stores the object within a staging sub-system of the distributed storage system and provides a first response to the requesting client. If a predefined condition is met, the server computer transfers objects from the staging sub-system to the tape storage system. For each transferred object, the server computer adds a reference to the object to a tape management sub-system, identifies a corresponding parent object associated with the object and its metadata within a parent object management sub-system of the distributed storage system, and updates the parent object's metadata to include the object's location within the tape storage system.

26 Claims, 16 Drawing Sheets

(56) References Cited

U.S. PATENT DOCUMENTS

| | | | |
|---|---|---|---|
| 6,728,751 B1 | 4/2004 | Cato et al. | |
| 6,832,227 B2 | 12/2004 | Seki et al. | |
| 6,857,012 B2 | 2/2005 | Sim et al. | |
| 6,883,068 B2 | 4/2005 | Tsirigotis et al. | |
| 6,898,609 B2 | 5/2005 | Kerwin | |
| 6,973,464 B1 | 12/2005 | Gao | |
| 7,107,419 B1 | 9/2006 | Ghemawat et al. | |
| 7,155,463 B1 | 12/2006 | Wang et al. | |
| 7,251,670 B1 | 7/2007 | Day | |
| 7,293,154 B1 | 11/2007 | Karr et al. | |
| 7,320,059 B1 | 1/2008 | Armangau et al. | |
| 7,450,503 B1 | 11/2008 | Ginjpalli et al. | |
| 7,506,338 B2 | 3/2009 | Alpern et al. | |
| 7,558,927 B2 * | 7/2009 | Clark et al. | 711/162 |
| 7,567,973 B1 | 7/2009 | Burrows et al. | |
| 7,571,144 B2 | 8/2009 | Beckstrom et al. | |
| 7,647,329 B1 | 1/2010 | Fischman et al. | |
| 7,653,668 B1 | 1/2010 | Shelat et al. | |
| 7,660,836 B2 * | 2/2010 | Bolik et al. | 707/640 |
| 7,693,882 B2 | 4/2010 | Lee et al. | |
| 7,716,171 B2 * | 5/2010 | Kryger | 707/649 |
| 7,761,412 B2 | 7/2010 | Talius et al. | |
| 7,761,678 B1 | 7/2010 | Bodmer et al. | |
| 7,774,444 B1 | 8/2010 | George et al. | |
| 7,778,972 B1 | 8/2010 | Cormie et al. | |
| 7,778,984 B2 | 8/2010 | Zhang et al. | |
| 7,885,928 B2 | 2/2011 | Harrington et al. | |
| 7,958,088 B2 | 6/2011 | Yerneni et al. | |
| 8,010,514 B2 | 8/2011 | Zhang et al. | |
| 8,099,388 B2 | 1/2012 | Shen et al. | |
| 8,112,510 B2 | 2/2012 | Alon et al. | |
| 8,190,561 B1 | 5/2012 | Poole et al. | |
| 8,484,206 B2 | 7/2013 | Schmidt et al. | |
| 2002/0078300 A1 | 6/2002 | Dharap | |
| 2002/0147774 A1 | 10/2002 | Lisiecki et al. | |
| 2003/0033308 A1 | 2/2003 | Patel et al. | |
| 2003/0056082 A1 | 3/2003 | Maxfield | |
| 2003/0149709 A1 | 8/2003 | Banks | |
| 2003/0154449 A1 | 8/2003 | Teig et al. | |
| 2004/0199810 A1* | 10/2004 | Tarcea et al. | 714/6 |
| 2004/0215604 A1 | 10/2004 | Shaji et al. | |
| 2004/0236763 A1 | 11/2004 | Krishnamoorthy et al. | |
| 2004/0255003 A1 | 12/2004 | Tecu et al. | |
| 2005/0097285 A1 | 5/2005 | Karamanolis et al. | |
| 2005/0125325 A1 | 6/2005 | Chai et al. | |
| 2005/0160078 A1 | 7/2005 | Benson et al. | |
| 2005/0198359 A1 | 9/2005 | Basani et al. | |
| 2006/0026219 A1 | 2/2006 | Orenstein et al. | |
| 2006/0112140 A1 | 5/2006 | McBride et al. | |
| 2006/0221190 A1* | 10/2006 | Limberis et al. | 348/207.1 |
| 2006/0253498 A1 | 11/2006 | Barrs et al. | |
| 2006/0253503 A1 | 11/2006 | Barrs et al. | |
| 2007/0050415 A1 | 3/2007 | Armangau et al. | |
| 2007/0078901 A1 | 4/2007 | Satou et al. | |
| 2007/0143372 A1 | 6/2007 | Martinez et al. | |
| 2007/0156842 A1 | 7/2007 | Vermeulen et al. | |
| 2007/0174660 A1 | 7/2007 | Peddada | |
| 2007/0203910 A1 | 8/2007 | Ferguson et al. | |
| 2007/0266204 A1 | 11/2007 | Mizuno | |
| 2007/0283017 A1* | 12/2007 | Anand et al. | 709/226 |
| 2008/0027884 A1 | 1/2008 | Boutault | |
| 2008/0147821 A1* | 6/2008 | Dietrich et al. | 709/216 |
| 2009/0083342 A1 | 3/2009 | Tomic et al. | |
| 2009/0083563 A1 | 3/2009 | Murase | |
| 2009/0222884 A1 | 9/2009 | Shaji et al. | |
| 2009/0228532 A1 | 9/2009 | Anzai | |
| 2009/0240664 A1 | 9/2009 | Dinker et al. | |
| 2009/0265519 A1 | 10/2009 | Moore et al. | |
| 2009/0271412 A1 | 10/2009 | Lacapra et al. | |
| 2009/0276408 A1 | 11/2009 | Auerbach et al. | |
| 2009/0327602 A1 | 12/2009 | Moore et al. | |
| 2010/0017037 A1 | 1/2010 | Nam et al. | |
| 2010/0057502 A1 | 3/2010 | Arguelles et al. | |
| 2010/0094981 A1 | 4/2010 | Cordray et al. | |
| 2010/0115216 A1 | 5/2010 | Jia et al. | |
| 2010/0138495 A1 | 6/2010 | Mcintyre et al. | |
| 2010/0189262 A1 | 7/2010 | Ducharme et al. | |
| 2010/0241660 A1 | 9/2010 | Bhorania et al. | |
| 2010/0274762 A1 | 10/2010 | Murphy et al. | |
| 2010/0281051 A1 | 11/2010 | Sheffi et al. | |
| 2010/0325476 A1 | 12/2010 | Zhang et al. | |
| 2011/0016429 A1 | 1/2011 | Yoshihama | |
| 2011/0185013 A1* | 7/2011 | Obata et al. | 709/203 |
| 2011/0196832 A1 | 8/2011 | Zunger et al. | |
| 2011/0238625 A1* | 9/2011 | Hamaguchi et al. | 707/640 |

OTHER PUBLICATIONS

Google Inc., PCT/US2011/024247, Feb. 9, 2011, International Search Report and Written Opinion mailed Sep. 23, 2011, 15 pgs.

Google Inc., PCT/US2011/024249, Feb. 9, 2011, International Search Report and Written Opinion mailed Apr. 26, 2011, 10 pgs.

Chang et al., "Bigtable: A Distributed Storage System for Structured Data," OSDI, Oct. 31, 2006, 1-14 pgs.

Ghemawat et al., "The Google File System," SOSP' 03, Oct. 19-22, 2003, 15 pgs.

Google Code, "Protocol Buffers Language Guide," Jul. 11, 2008, 16 pgs. http://code.google.com/apis/protocolbuffers/docs/proto.html.

Korn et al., "The VCDIFF Generic Differencing and Compression Data Format," RFC 3284, Jun. 2002, 1-29 pgs.

Barrett, How Index Building Works, Google Code, Nov. 24, 2008, 3 pgs.

Xu, A Dynamic Distributed Replica Management Mechanism Based on Accessing Frequency Detecting, ACM SIGOPS, vol. 38, iss. 3, 2004, 9 pgs.

Little, The Replica Management System: a Scheme for Flexible and Dynamic Replication, IEEE Proc. Of 2nd Int'l Workshop on Configurable Distributed Systems, 1994, pp. 46-57.

Google Inc., Communication pursuant to Article 94(3) EPC, 11704385.1, Nov. 8, 2013, 5 pgs.

Google Inc., Communication Pursuant to Article 94(3) EPC, EP 11704384.4, Nov. 8, 2013, 5 pgs.

Google Inc., Communication Pursuant to Article 94(3) EPC, EP 11705357.9, Dec. 5, 2013, 6 pgs.

* cited by examiner

Server Allocation

| Task / Function | Typical Number of Servers at an Instance |
|---|---|
| 502 — Blobmaster | 10 |
| 504 — Bitpusher | 100 |
| 506 — BigTable Servers | 50 |
| 508 — File System Servers | 1000 |
| 510 — Tape Servers | 10 |
| 512 — Tape Master | 5 |
| 514 — Replication Management | 10 |
| 516 — Quorum Clock Server | 5 |

Delta Data Elements

Batch Table Record 930

Batch Table
| Batch ID (e.g., a file system directory name) | 932 |
| Batch Type (Backup or restore) | 934 |
| Locality Range (start, limit) | 936 |
| Current Batch State (Open, Settling, Close, Gtaping, Finalizing, Inactive) | 938 |
| Batch Creation Time | 940 |
| Tape System Job Status (e.g., submitted, successful, failed, canceled) | 942 |
| Chunk Files List (including the state of each chunk file, e.g., staged, failed, completed) | 944 |
| Batch Size | 946 |

Figure 9D

Chunk Backup Record 950

Chunk Backup Metadata
| Chunk ID (content hash + sequence ID) | 954 |
| Blob Back Reference | 956 |
|   Blob Base ID | 956-1 |
|   Chunk Offset within the blob | 956-3 |
|   Chunk size | 956-5 |
|   Representation Type | 956-7 |
|   Blob Generation ID (64 bits) | 956-9 |

Figure 9E

Chunk Restore Record 960

Chunk Restore Metadata
| Chunk ID (content hash + sequence ID) | 964 |
| Storage reference of destination ChunkStore | 966 |
| Blob Back Reference | 968 |
|   Blob Base ID | 968-1 |
|   Chunk Offset within the blob | 968-3 |
|   Chunk size | 968-5 |
|   Representation Type | 968-7 |
|   Blob Generation ID (64 bits) | 968-9 |

Figure 9F

METHOD AND SYSTEM FOR PROVIDING EFFICIENT ACCESS TO A TAPE STORAGE SYSTEM

PRIORITY

This application claims priority to U.S. Provisional Application Ser. No. 61/302,909, filed Feb. 9, 2010, entitled "Method and System for Providing Efficient Access to a Tape Storage System", which is incorporated by reference herein in its entirety.

TECHNICAL FIELD

The disclosed embodiments relate generally to database replication, and more specifically to replication of data between a distributed storage system and a tape storage system.

BACKGROUND

For weakly mutable data, changes or mutations at one instance (or replica) of the data must ultimately replicate to all other instances of the database, but there is no strict time limit on when the updates must occur. This is an appropriate model for certain data that does not change often, particular when there are many instances of the database at locations distributed around the globe.

Replication of large quantities of data on a planetary scale can be both slow and inefficient. In particular, the long-haul network paths have limited bandwidth. In general, a single change to a large piece of data entails transmitting that large piece of data through the limited bandwidth of the network. Furthermore, the same large piece of data is transmitted to each of the database instances, which multiplies the bandwidth usage by the number of database instances.

In addition, network paths and data centers sometimes fail or become unavailable for periods of time (both unexpected outages as well as planned outages for upgrades, etc.). Generally, replicated systems do not handle such outages gracefully, often requiring manual intervention. When replication is based on a static network topology and certain links become unavailable or more limited, replication strategies based on the original static network may be inefficient or ineffective.

Tape-based storage systems have been proved to be reliable and cost-effective for managing large volumes of data. But as a medium that only supports serial access, it is always challenging for tape to be seamlessly integrated into a data storage system that requires the support of random access. Moreover, compared with the other types of storage media like disk and flash, tape's relative low throughput is another important factor that limits its wide adoption by many large-scale data-intensive applications.

SUMMARY

The above deficiencies and other problems associated with replicating data for a distributed database to multiple replicas across a widespread distributed system are addressed by the disclosed embodiments. In some of the disclosed embodiments, changes to an individual piece of data are tracked as deltas, and the deltas are transmitted to other instances of the database rather than transmitting the piece of data itself. In some embodiments, reading the data includes reading both an underlying value and any subsequent deltas, and thus a client reading the data sees the updated value even if the deltas has not been incorporated into the underlying data value. In some embodiments, distribution of the data to other instances takes advantage of the network tree structure to reduce the amount of data transmitted across the long-haul links in the network. For example, data that needs to be transmitted from Los Angeles to both Paris and Frankfurt could be transmitted to Paris, with a subsequent transmission from Paris to Frankfurt.

In accordance with some embodiments, a computer-implemented method for asynchronously replicating data onto a tape medium is implemented at one or more server computers, each having one or more processors and memory. The memory stores one or more programs for execution by the one or more processors on each server computer, which is associated with a distributed storage system and connected to a tape storage system.

Upon receiving a first request from a client for storing an object within the tape storage system, the server computer stores the object within a staging sub-system of the distributed storage system. In some embodiments, the staging sub-system includes a plurality of objects scheduled to be transferred to the tape storage system. The server computer then provides a first response to the requesting client, the first response indicating that the first request has been performed synchronously. If a predefined condition is met, the server computer transfers one or more objects from the staging sub-system to the tape storage system. For each transferred object, the server computer adds a reference to the object to a tape management sub-system of the tape storage system, identifies a corresponding parent object associated with the object and its metadata within a parent object management sub-system of the distributed storage system, and updates the parent object's metadata to include the object's location within the tape storage system.

In some embodiments, upon receipt of the first request, the server computer submits a second request for the object to the source storage sub-system and receives a second response that includes the requested object from the source storage sub-system.

In some embodiments, before storing the object within the staging sub-system, the server computer queries the tape management sub-system to determine whether there is a replica of the object within the tape storage system. If there is a replica of the object within the tape storage system, the server computer adds a reference to the replica of the object to the tape management sub-system.

In some embodiments, the tape management sub-system of the distributed storage system includes a staging object index table and an external object index table. An entry in the staging object index table identifies an object that has been scheduled to be transferred to the tape storage system and an entry in the external object index table identifies an object that has been transferred to the tape storage system.

In some embodiments, there is a replica of the object within the tape storage system if either of the staging and external object index tables includes an entry that corresponds to the object to be transferred to the tape storage system. There is no replica of the object within the tape storage system if neither of the staging and external object index tables includes an entry that corresponds to the object to be transferred to the tape storage system. In some embodiments, the server computer adds to the staging object index table an entry that corresponds to the object.

In some embodiments, for each newly-transferred object, the server computer removes from the staging object index table an entry that corresponds to the newly-transferred object and adds to the external object index table an entry that corresponds to the newly-transferred object.

In some embodiments, the staging sub-system includes one or more batches of object transfer entries and an object data staging region. The server computer stores the object to be transferred within the object data staging region, identifies a respective batch in accordance with a locality hint provided with the first request, the locality hint identifying a group of objects that are likely to be collectively restored from the tape storage system or expire from the tape storage system, inserts an object transfer entry into the identified batch, the object transfer entry identifying a location of the object within the object data staging region, and updates a total size of the identified batch in accordance with the newly-inserted object transfer entry and the object to be transferred.

In some embodiments, each object to be transferred includes content and metadata. The server computer writes the object's content into a first file in the object data staging region and the object's metadata into a second file or a bigtable in the object data staging region.

In some embodiments, the first response is provided to the requesting client before the object is transferred to the tape storage system.

In some embodiments, the staging sub-system of the distributed storage system includes one or more batches of object transfer entries and an object data staging region. The server computer periodically scans the one or more batches to determine their respective states and identifies a respective batch of object transfer entries if a total size of the batch reaches a predefined threshold or the batch has been opened for at least a predefined time period. The server computer then closes the identified batch from accepting any more object transfer entry and submits an object transfer request to the tape storage system for the identified batch. For each object transfer entry within the identified batch, the server computer retrieves the corresponding object from the object data staging region and transfers the object to the tape storage system. In some embodiments, using separate batches for tape backup or restore makes it possible to prioritize the jobs submitted by different users or for different purposes.

In some embodiments, the server computer deletes the identified batch from the staging sub-system after the last object transfer entry within the identified batch is processed. In some embodiments, the closure of the identified batch triggers a creation of a new batch for incoming object transfer entries in the staging sub-system.

In some embodiments, for each object transfer entry within the identified batch, the server computer deletes the object transfer entry and the corresponding object from the identified batch and the object data staging region, respectively.

In some embodiments, for each transferred object, the server computer sets the parent object's state as "finalized" if the object is the last object of the parent object to be transferred to the tape storage system and sets the parent object's state as "finalizing" if the object is not the last object of the parent object to be transferred to the tape storage system.

In accordance with some embodiments, a computer-implemented method for asynchronously replicating data from a tape medium is implemented at one or more server computers, each having one or more processors and memory. The memory stores one or more programs for execution by the one or more processors on each server computer, which is associated with a distributed storage system and connected to a tape storage system.

Upon receiving a first request from a client for restoring an object from the tape storage system to a destination storage sub-system of the distributed storage system, the server computer generates an object restore entry that identifies the object to be restored and the destination storage sub-system and stores the object restore entry within a staging sub-system of the distributed storage system. In some embodiments, the staging sub-system includes a plurality of object restore entries scheduled to be applied to the tape storage system. The server computer then provides a first response to the requesting client, indicating that the first request will be performed asynchronously, and applies one or more object restore entries within the staging sub-system to the tape storage system if a predefined condition is met. For each restored object, the server computer transfers the object to the destination storage sub-system, identifies a corresponding parent object associated with the object and its metadata within a parent object management sub-system of the distributed storage system, and updates the parent object's metadata to identify the object's location within destination storage sub-system.

In some embodiments, the staging sub-system includes one or more batches of object restore entries and an object data staging region. The server computer identifies a respective batch in accordance with a restore priority provided with the first request, inserts the object restore entry into the identified batch, and updates a total size of the identified batch in accordance with the newly-inserted object restore entry.

In some embodiments, the first response is provided to the requesting client before the object is restored from the tape storage system.

In some embodiments, the server computer periodically scans the one or more batches to determine their respective states and identifies a respective batch of object restore entries if a total size of the batch reaches a predefined threshold or the batch has been opened for at least a predefined time period. Next, the server computer closes the identified batch from accepting any more object restore entry and submits an object restore request to the tape storage system for the closed batch. For each object restore entry within the identified batch, the server computer retrieves the object's content and metadata from the tape storage system and then writes the object's content into a first file in the object data staging region and the object's metadata into a second file in the object data staging region.

In some embodiments, the closure of the identified batch triggers a creation of a new batch for incoming object restore entries in the staging sub-system.

In some embodiments, the server computer associates the destination storage sub-system in the object restore entry with the object in the object data staging region, sends a request to an object management sub-system, the request identifying the destination storage sub-system and including a copy of the object in the object data staging region, and deletes the object restore entry and the corresponding object from the identified batch and the object data staging region, respectively.

In some embodiments, for each restored object, the server computer sets the parent object's state as "finalized" if the object is the last object of the parent object to be restored from the tape storage system and sets the parent object's state as "finalizing" if the object is not the last object of the parent object to be restored from the tape storage system.

Thus methods and systems are provided that make replication of data in distributed databases faster, and enable more efficient use of network resources. Faster replication results in providing users with updated information (or access to information) more quickly; and more efficient usage of network bandwidth leaves more bandwidth available for other tasks, making other processes run faster.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIGS. 9A-9F illustrate block diagrams and data structures used for replicating data between a planetary-scale distributed storage system and a tape storage system according to some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

DESCRIPTION OF EMBODIMENTS

Figure 1A:
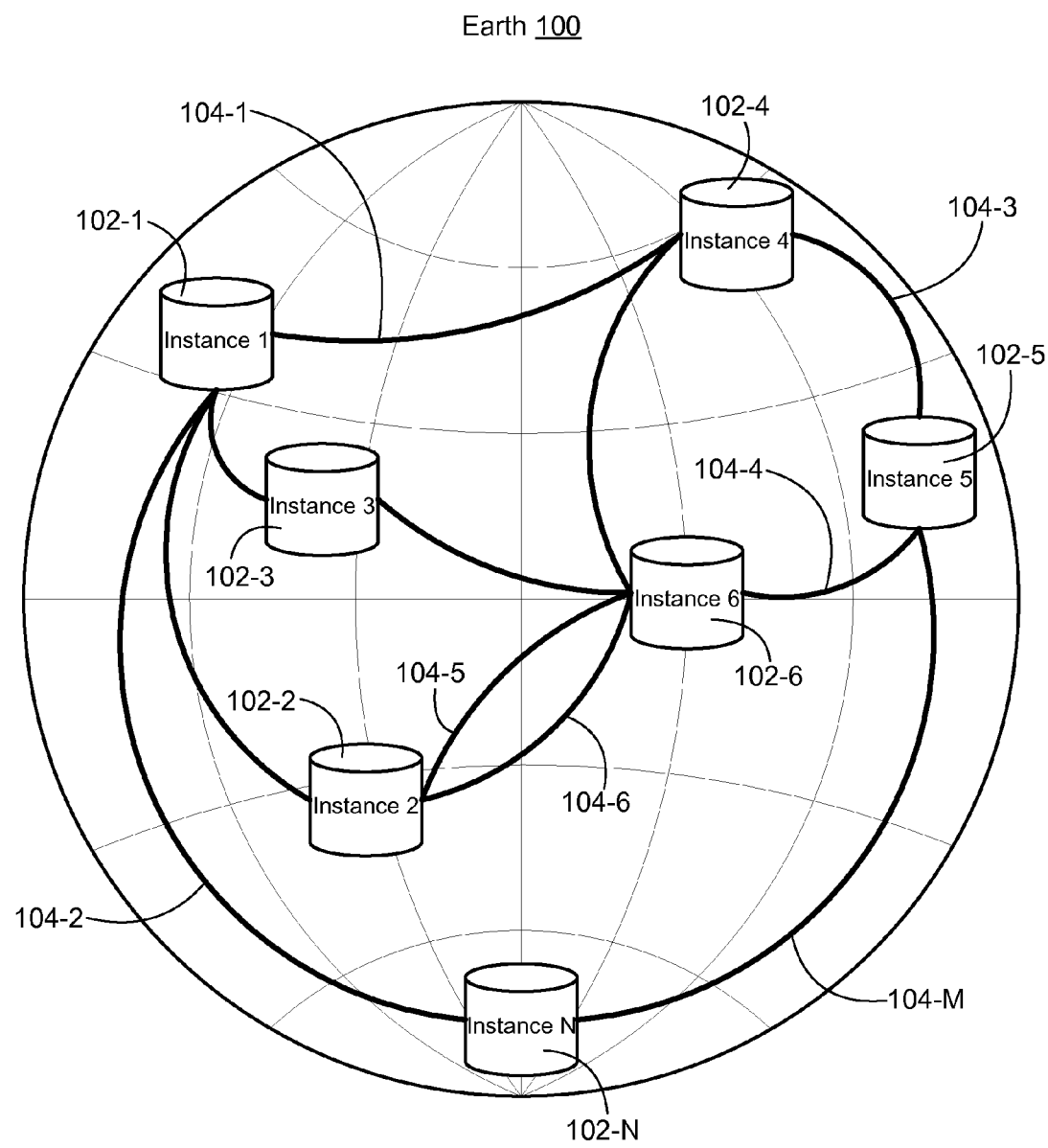
FIG. 1A is a conceptual illustration for placing multiple instances of a database at physical sites all over the globe according to some embodiments.
Figure 2:
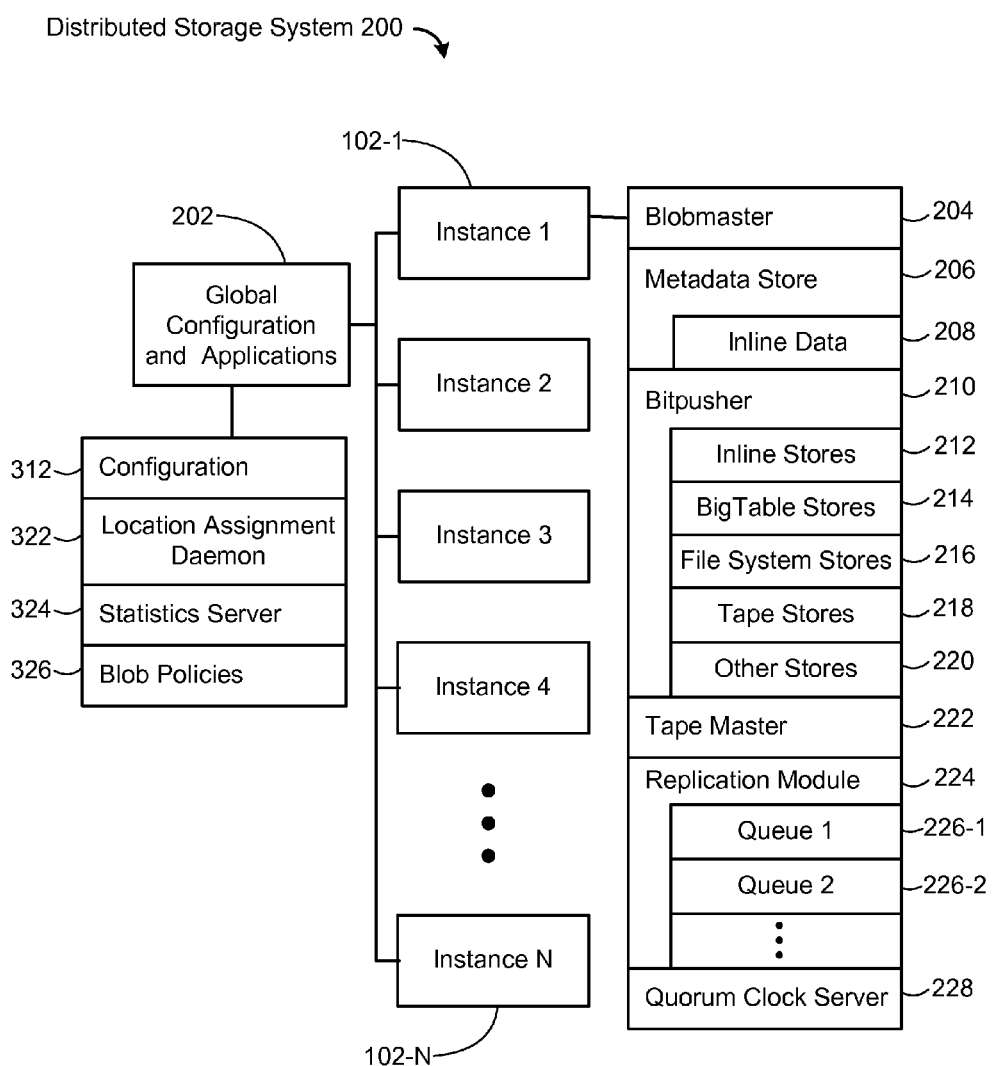
FIG. 2 is a block diagram illustrating multiple instances of a replicated database, with an exemplary set of programs and/or processes shown for the first instance according to some embodiments.
Figure 3:
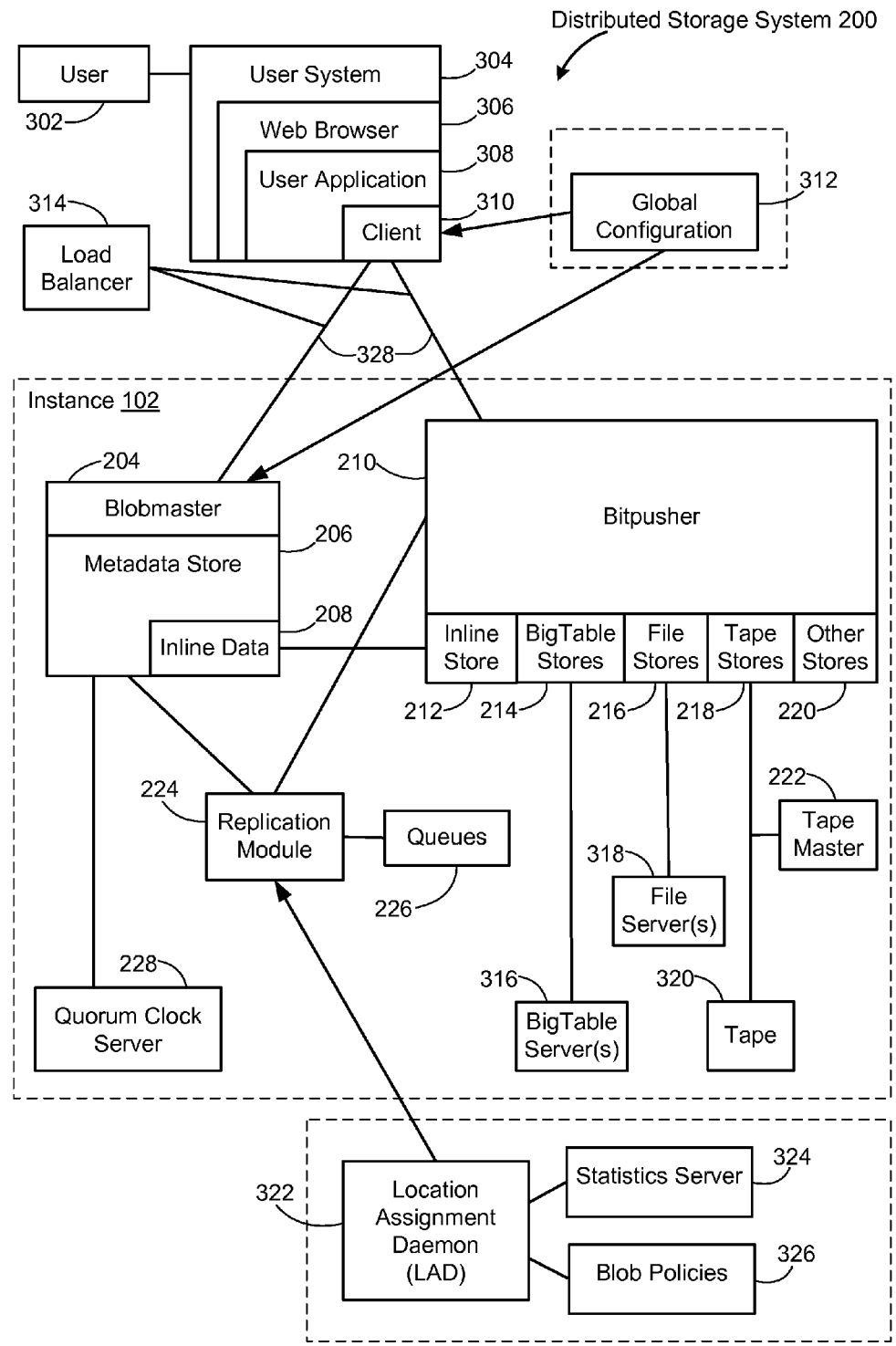
FIG. 3 is a block diagram that illustrates an exemplary instance for the system, and illustrates what blocks within the instance a user interacts with according to some embodiments.

The present specification describes a distributed storage system. In some embodiments, as illustrated in FIG. 1A, the distributed storage system is implemented on a global or planet-scale. In these embodiments, there is a plurality of instances 102-1, 102-2, . . . 102-N at various locations on the Earth 100, connected by network communication links 104-1, 104-2, . . . 104-M. In some embodiments, an instance (such as instance 102-1) corresponds to a data center. In other embodiments, multiple instances are physically located at the same data center. Although the conceptual diagram of FIG. 1 shows a limited number of network communication links 104-1, etc., typical embodiments would have many more network communication links. In some embodiments, there are two or more network communication links between the same pair of instances, as illustrated by links 104-5 and 104-6 between instance 2 (102-2) and instance 6 (102-6). In some embodiments, the network communication links are composed of fiber optic cable. In some embodiments, some of the network communication links use wireless technology, such as microwaves. In some embodiments, each network communication link has a specified bandwidth and/or a specified cost for the use of that bandwidth. In some embodiments, statistics are maintained about the transfer of data across one or more of the network communication links, including throughput rate, times of availability, reliability of the links, etc. Each instance typically has data stores and associated databases (as shown in FIGS. 2 and 3), and utilizes a farm of server computers ("instance servers," see FIG. 4) to perform all of the tasks. In some embodiments, there are one or more instances that have limited functionality, such as acting as a repeater for data transmissions between other instances. Limited functionality instances may or may not have any of the data stores depicted in FIGS. 3 and 4.

Figure 1B:
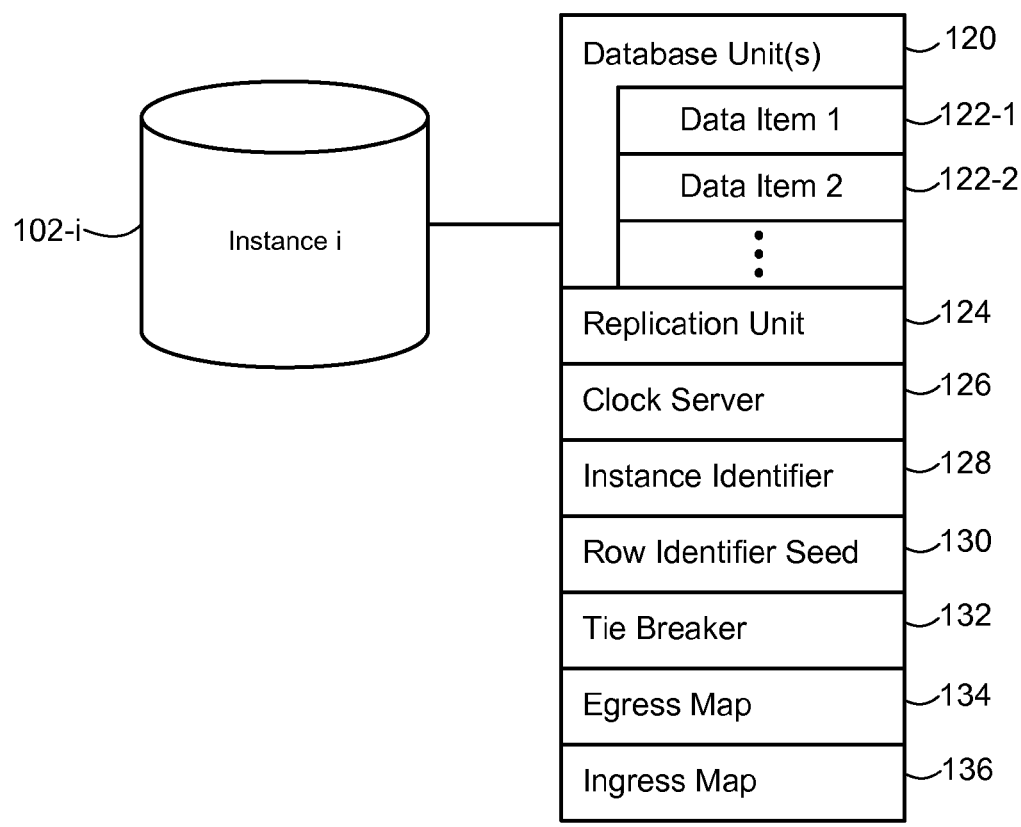
FIG. 1B illustrates basic functionality at each instance according to some embodiments.

FIG. 1B illustrates data and programs at an instance 102-$i$ that store and replicate data between instances. The underlying data items 122-1, 122-2, etc. are stored and managed by one or more database units 120. Each instance 102-$i$ has a replication unit 124 that replicates data to and from other instances. The replication unit 124 also manages one or more egress maps 134 that track data sent to and acknowledged by other instances. Similarly, the replication unit 124 manages one or more ingress maps, which track data received at the instance from other instances.

Each instance 102-$i$ has one or more clock servers 126 that provide accurate time. In some embodiments, the clock servers 126 provide time as the number of microseconds past a well-defined point in the past. In some embodiments, the clock servers provide time readings that are guaranteed to be monotonically increasing. In some embodiments, each instance server 102-$i$ stores an instance identifier 128 that uniquely identifies itself within the distributed storage system. The instance identifier may be saved in any convenient format, such as a 32-bit integer, a 64-bit integer, or a fixed length character string. In some embodiments, the instance identifier is incorporated (directly or indirectly) into other unique identifiers generated at the instance. In some embodiments, an instance 102-$i$ stores a row identifier seed 130, which is used when new data items 122 are inserted into the database. A row identifier is used to uniquely identify each data item 122. In some embodiments, the row identifier seed is used to create a row identifier, and simultaneously incremented, so that the next row identifier will be greater. In other embodiments, unique row identifiers are created from a timestamp provided by the clock servers 126, without the use of a row identifier seed. In some embodiments, a tie breaker value 132 is used when generating row identifiers or unique identifiers for data changes (described below with respect to FIGS. 6-7). In some embodiments, a tie breaker 132 is stored permanently in non-volatile memory (such as a magnetic or optical disk).

The elements described in FIG. 1B are incorporated in embodiments of the distributed storage system 200 illustrated in FIGS. 2 and 3. In some embodiments, the functionality described in FIG. 1B is included in a blobmaster 204 and metadata store 206. In these embodiments, the primary data storage (i.e., blobs) is in the data stores 212, 214, 216, 218, and 220, and managed by bitpushers 210. The metadata for the blobs is in the metadata store 206, and managed by the blobmaster 204. The metadata corresponds to the functionality identified in FIG. 1B. Although the metadata for storage of blobs provides an exemplary embodiment of the present invention, one of ordinary skill in the art would recognize that the present invention is not limited to this embodiment.

The distributed storage system 200 shown in FIGS. 2 and 3 includes certain global applications and configuration information 202, as well as a plurality of instances 102-1, . . . 102-N. In some embodiments, the global configuration information includes a list of instances and information about each instance. In some embodiments, the information for each instance includes: the set of storage nodes (data stores) at the instance; the state information, which in some embodiments includes whether the metadata at the instance is global or local; and network addresses to reach the blobmaster 204 and bitpusher 210 at the instance. In some embodiments, the global configuration information 202 resides at a single physical location, and that information is retrieved as needed. In other embodiments, copies of the global configuration information 202 are stored at multiple locations. In some embodiments, copies of the global configuration information 202 are stored at some or all of the instances. In some embodiments, the global configuration information can only be modified at a single location, and changes are transferred to other locations by one-way replication. In some embodiments, there are certain global applications, such as the location assignment daemon 346 (see FIG. 3) that can only run at one location at any given time. In some embodiments, the global applications run at a selected instance, but in other embodiments, one or more of the global applications runs on a set of servers distinct from the instances. In some embodiments, the location where a global application is running is specified as part of the global configuration information 202, and is subject to change over time.

FIGS. 2 and 3 illustrate an exemplary set of programs, processes, and data that run or exist at each instance, as well as a user system that may access the distributed storage system 200 and some global applications and configuration. In some embodiments, a user 302 interacts with a user system 304, which may be a computer or other device that can run a web browser 306. A user application 308 runs in the web browser, and uses functionality provided by database client 310 to access data stored in the distributed storage system 200 using network 328. Network 328 may be the Internet, a local area network (LAN), a wide area network (WAN), a wireless network (WiFi), a local intranet, or any combination of these. In some embodiments, a load balancer 314 distributes the workload among the instances, so multiple requests issued by a single client 310 need not all go to the same instance. In some embodiments, database client 310 uses information in a global configuration store 312 to identify an appropriate instance for a request. The client uses information from the global configuration store 312 to find the set of blobmasters 204 and bitpushers 210 that are available, and where to contact them. A blobmaster 204 uses a global configuration store 312 to identify the set of peers for all of the replication processes. A bitpusher 210 uses information in a global configuration store 312 to track which stores it is responsible for. In some embodiments, user application 308 runs on the user system 304 without a web browser 306. Exemplary user applications are an email application and an online video application.

In some embodiments, each instance has a blobmaster 204, which is a program that acts as an external interface to the metadata table 206. For example, an external user application 308 can request metadata corresponding to a specified blob using client 310. Note that a "blob" (i.e., a binary large object) is a collection of binary data (e.g., images, videos, binary files, executable code, etc.) stored as a single entity in a database. This specification uses the terms "blob" and "object" interchangeably and embodiments that refer to a "blob" may also be applied to "objects," and vice versa. In general, the term "object" may refer to a "blob" or any other object such as a database object, a file, or the like, or a portion (or subset) of the aforementioned objects. In some embodiments, every instance 102 has metadata in its metadata table 206 corresponding to every blob stored anywhere in the distributed storage system 200. In other embodiments, the instances come in two varieties: those with global metadata (for every blob in the distributed storage system 200) and those with only local metadata (only for blobs that are stored at the instance). In particular, blobs typically reside at only a small subset of the instances. The metadata table 206 includes information relevant to each of the blobs, such as which instances have copies of a blob, who has access to a blob, and what type of data store is used at each instance to store a blob. The exemplary data structures in FIGS. 8A-8E illustrate other metadata that is stored in metadata table 206 in some embodiments.

When a client 310 wants to read a blob of data, the blobmaster 204 provides one or more read tokens to the client 310, which the client 310 provides to a bitpusher 210 in order to gain access to the relevant blob. When a client 310 writes data, the client 310 writes to a bitpusher 210. The bitpusher 210 returns write tokens indicating that data has been stored, which the client 310 then provides to the blobmaster 204, in order to attach that data to a blob. A client 310 communicates with a bitpusher 210 over network 328, which may be the same network used to communicate with the blobmaster 204. In some embodiments, communication between the client 310 and bitpushers 210 is routed according to a load balancer 314. Because of load balancing or other factors, communication with a blobmaster 204 at one instance may be followed by communication with a bitpusher 210 at a different instance. For example, the first instance may be a global instance with metadata for all of the blobs, but may not have a copy of the desired blob. The metadata for the blob identifies which instances have copies of the desired blob, so in this example the subsequent communication with a bitpusher 210 to read or write is at a different instance.

A bitpusher 210 copies data to and from data stores. In some embodiments, the read and write operations comprise entire blobs. In other embodiments, each blob comprises one or more chunks, and the read and write operations performed by a bitpusher are on solely on chunks. In some of these embodiments, a bitpusher deals only with chunks, and has no knowledge of blobs. In some embodiments, a bitpusher has no knowledge of the contents of the data that is read or written, and does not attempt to interpret the contents. Embodiments of a bitpusher 210 support one or more types of data store. In some embodiments, a bitpusher supports a plurality of data store types, including inline data stores 212, BigTable stores 214, file server stores 216, and tape stores 218. Some embodiments support additional other stores 220, or are designed to accommodate other types of data stores as they become available or technologically feasible.

Inline stores 212 actually use storage space 208 in the metadata store 206. Inline stores provide faster access to the data, but have limited capacity, so inline stores are generally for relatively "small" blobs. In some embodiments, inline stores are limited to blobs that are stored as a single chunk. In some embodiments, "small" means blobs that are less than 32 kilobytes. In some embodiments, "small" means blobs that are less than 1 megabyte. As storage technology facilitates greater storage capacity, even blobs that are currently considered large may be "relatively small" compared to other blobs.

BigTable stores 214 store data in BigTables located on one or more BigTable database servers 316. BigTables are described in several publicly available publications, including "Bigtable: A Distributed Storage System for Structured Data," Fay Chang et al, OSDI 2006, which is incorporated herein by reference in its entirety. In some embodiments, the BigTable stores save data on a large array of servers 316.

File stores 216 store data on one or more file servers 318. In some embodiments, the file servers use file systems provided by computer operating systems, such as UNIX. In other embodiments, the file servers 318 implement a proprietary file system, such as the Google File System (GFS). GFS is described in multiple publicly available publications, including "The Google File System," Sanjay Ghemawat et al., SOSP'03, Oct. 19-22, 2003, which is incorporated herein by reference in its entirety. In other embodiments, the file servers 318 implement NFS (Network File System) or other publicly available file systems not implemented by a computer operating system. In some embodiments, the file system is distributed across many individual servers 318 to reduce risk of loss or unavailability of any individual computer.

Tape stores 218 store data on physical tapes 320. Unlike a tape backup, the tapes here are another form of storage. This is described in greater detail in co-pending U.S. Provisional Patent Application Ser. No. 61/302,909, filed Feb. 9, 2010, subsequently, filed as U.S. patent application Ser. No. 13/023, 498, filed Feb. 8, 2011, "Method and System for Providing Efficient Access to a Tape Storage System," which is incorporated herein by reference in its entirety. In some embodiments, a Tape Master application 222 assists in reading and writing from tape. In some embodiments, there are two types of tape: those that are physically loaded in a tape device, so that the tapes can be robotically loaded; and those tapes that physically located in a vault or other offline location, and require human action to mount the tapes on a tape device. In some instances, the tapes in the latter category are referred to as deep storage or archived. In some embodiments, a large read/write buffer is used to manage reading and writing data to tape. In some embodiments, this buffer is managed by the tape master application 222. In some embodiments there are separate read buffers and write buffers. In some embodiments, a client 310 cannot directly read or write to a copy of data that is stored on tape. In these embodiments, a client must read a copy of the data from an alternative data source, even if the data must be transmitted over a greater distance.

In some embodiments, there are additional other stores 220 that store data in other formats or using other devices or technology. In some embodiments, bitpushers 210 are designed to accommodate additional storage technologies as they become available.

Each of the data store types has specific characteristics that make them useful for certain purposes. For example, inline stores provide fast access, but use up more expensive limited space. As another example, tape storage is very inexpensive, and provides secure long-term storage, but a client cannot directly read or write to tape. In some embodiments, data is automatically stored in specific data store types based on matching the characteristics of the data to the characteristics of the data stores. In some embodiments, users 302 who create files may specify the type of data store to use. In other embodiments, the type of data store to use is determined by the user application 308 that creates the blobs of data. In some embodiments, a combination of the above selection criteria is used. In some embodiments, each blob is assigned to a storage policy 326, and the storage policy specifies storage properties. A blob policy 326 may specify the number of copies of the blob to save, in what types of data stores the blob should be saved, locations where the copies should be saved, etc. For example, a policy may specify that there should be two copies on disk (BigTable stores or File Stores), one copy on tape, and all three copies at distinct metro locations. In some embodiments, blob policies 326 are stored as part of the global configuration and applications 202.

In some embodiments, each instance 102 has a quorum clock server 228, which comprises one or more servers with internal clocks. The order of events, including metadata deltas 608, is important, so maintenance of a consistent time clock is important. A quorum clock server regularly polls a plurality of independent clocks, and determines if they are reasonably consistent. If the clocks become inconsistent and it is unclear how to resolve the inconsistency, human intervention may be required. The resolution of an inconsistency may depend on the number of clocks used for the quorum and the nature of the inconsistency. For example, if there are five clocks, and only one is inconsistent with the other four, then the consensus of the four is almost certainly right. However, if each of the five clocks has a time that differs significantly from the others, there would be no clear resolution.

In some embodiments, each instance has a replication module 224, which identifies blobs or chunks that will be replicated to other instances. In some embodiments, the replication module 224 may use one or more queues 226-1, 226-2, . . . Items to be replicated are placed in a queue 226, and the items are replicated when resources are available. In some embodiments, items in a replication queue 226 have assigned priorities, and the highest priority items are replicated as bandwidth becomes available. There are multiple ways that items can be added to a replication queue 226. In some embodiments, items are added to replication queues 226 when blob or chunk data is created or modified. For example, if an end user 302 modifies a blob at instance 1, then the modification needs to be transmitted to all other instances that have copies of the blob. In embodiments that have priorities in the replication queues 226, replication items based on blob content changes have a relatively high priority. In some embodiments, items are added to the replication queues 226 based on a current user request for a blob that is located at a distant instance. For example, if a user in California requests a blob that exists only at an instance in India, an item may be inserted into a replication queue 226 to copy the blob from the instance in India to a local instance in California. That is, since the data has to be copied from the distant location anyway, it may be useful to save the data at a local instance. These dynamic replication requests receive the highest priority because they are responding to current user requests. The dynamic replication process is described in more detail in co-pending U.S. Provisional Patent Application Ser. No. 61/302,896, filed Feb. 9, 2010, subsequently filed as U.S. patent application Ser. No. 13/022,579, filed Feb. 7, 2011, "Method and System for Dynamically Replicating Data Within a Distributed Storage System," which is incorporated herein by reference in its entirety.

In some embodiments, there is a background replication process that creates and deletes copies of blobs based on blob policies 326 and blob access data provided by a statistics server 324. The blob policies specify how many copies of a blob are desired, where the copies should reside, and in what types of data stores the data should be saved. In some embodiments, a policy may specify additional properties, such as the number of generations of a blob to save, or time frames for saving different numbers of copies. E.g., save three copies for the first 30 days after creation, then two copies thereafter. Using blob policies 326, together with statistical information provided by the statistics server 324, a location assignment daemon 322 determines where to create new copies of a blob and what copies may be deleted. When new copies are to be created, records are inserted into a replication queue 226, with the lowest priority. The use of blob policies 326 and the operation of a location assignment daemon 322 are described in more detail in co-pending U.S. Provisional Patent Application Ser. No. 61/302,936, Feb. 9, 2010, subsequently filed as U.S. Pat. Ser. No. 13/022,290, filed Feb. 7, 2011, "System and Method for managing Replicas of Objects in a Distributed Storage System," which is incorporated herein by reference in its entirety.

Figure 4:
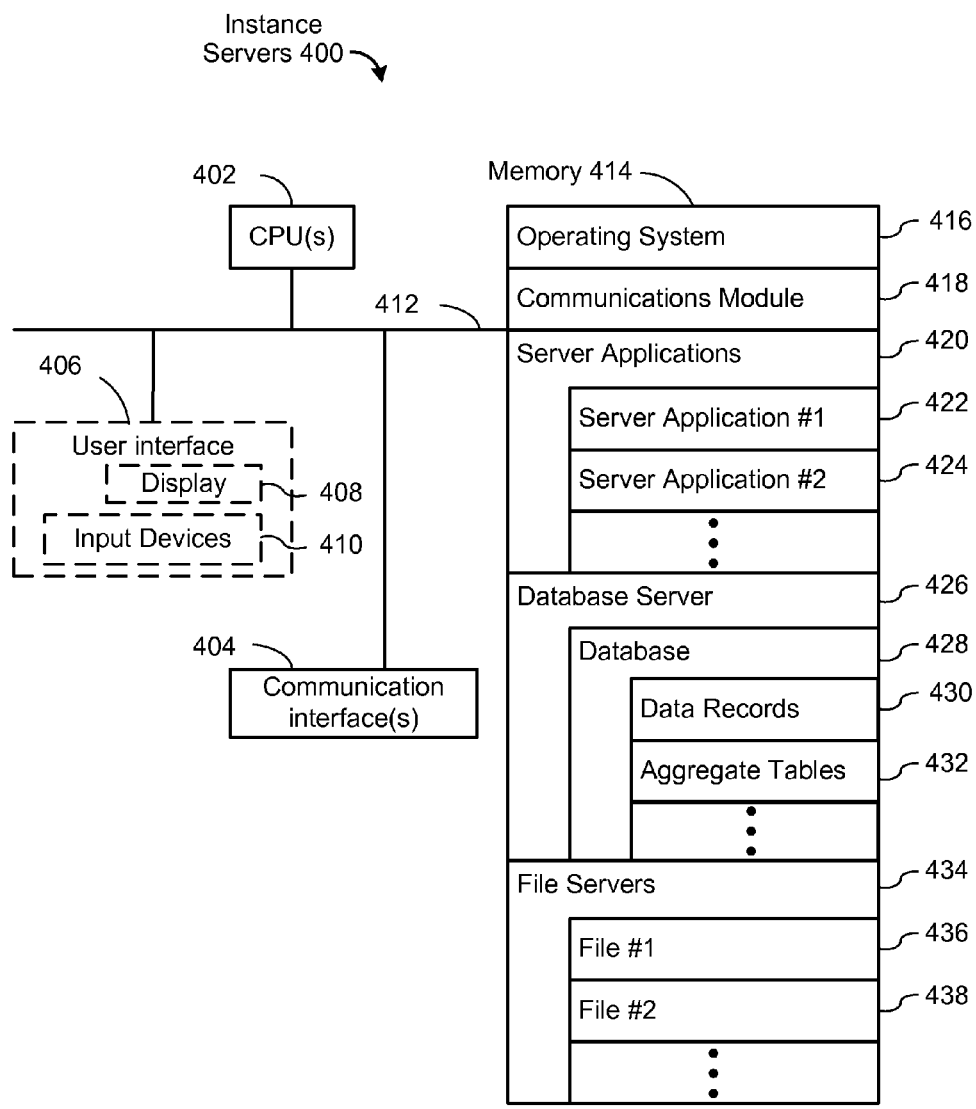
FIG. 4 is a block diagram of an instance server that may be used for the various programs and processes illustrated in FIGS. 1B, 2, and 3, according to some embodiments.

FIG. 4 is a block diagram illustrating an Instance Server 400 used for operations identified in FIGS. 2 and 3 in accordance with some embodiments of the present invention. An Instance Server 400 typically includes one or more processing units (CPU's) 402 for executing modules, programs and/or instructions stored in memory 414 and thereby performing processing operations; one or more network or other communications interfaces 404; memory 414; and one or more communication buses 412 for interconnecting these components. In some embodiments, an Instance Server 400 includes a user interface 406 comprising a display device 408 and one or more input devices 410. In some embodiments, memory 414 includes high-speed random access memory, such as DRAM, SRAM, DDR RAM or other random access solid state memory devices. In some embodiments, memory 414 includes non-volatile memory, such as one or more magnetic disk storage devices, optical disk storage devices, flash memory devices, or other non-volatile solid state storage devices. In some embodiments, memory 414 includes one or more storage devices remotely located from the CPU(s) 402. Memory 414, or alternately the non-volatile memory device(s) within memory 414, comprises a computer readable storage medium. In some embodiments, memory 414 or the computer readable storage medium of memory 414 stores the following programs, modules and data structures, or a subset thereof:

- an operating system 416 that includes procedures for handling various basic system services and for performing hardware dependent tasks;
- a communications module 418 that is used for connecting an Instance Server 400 to other Instance Servers or computers via the one or more communication network interfaces 404 (wired or wireless) and one or more communication networks 328, such as the Internet, other wide area networks, local area networks, metropolitan area networks, and so on;
- one or more server applications 420, such as a blobmaster 204 that provides an external interface to the blob metadata; a bitpusher 210 that provides access to read and write data from data stores; a replication module 224 that copies data from one instance to another; a quorum clock server 228 that provides a stable clock; a location assignment daemon 322 that determines where copies of a blob should be located; and other server functionality as illustrated in FIGS. 2 and 3. As illustrated, two or more server applications 422 and 424 may execute on the same physical computer;
- one or more database servers 426 that provides storage and access to one or more databases 428. The databases 428 may provide storage for metadata 206, replication queues 226, blob policies 326, global configuration 312, the statistics used by statistics server 324, as well as ancillary databases used by any of the other functionality. Each database 428 has one or more tables with data records 430. In some embodiments, some databases include aggregate tables 432, such as the statistics used by statistics server 324; and
- one or more file servers 434 that provide access to read and write files, such as file #1 (436) and file #2 (438). File server functionality may be provided directly by an operating system (e.g., UNIX or Linux), or by a software application, such as the Google File System (GFS).

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 414 may store a subset of the modules and data structures identified above. Furthermore, memory 414 may store additional modules or data structures not described above.

Although FIG. 4 shows an instance server used for performing various operations or storing data as illustrated in FIGS. 2 and 3, FIG. 4 is intended more as functional description of the various features which may be present in a set of one or more computers rather than as a structural schematic of the embodiments described herein. In practice, and as recognized by those of ordinary skill in the art, items shown separately could be combined and some items could be separated. For example, some items shown separately in FIG. 4 could be implemented on individual computer systems and single items could be implemented by one or more computer systems. The actual number of computers used to implement each of the operations, databases, or file storage systems, and how features are allocated among them will vary from one implementation to another, and may depend in part on the amount of data at each instance, the amount of data traffic that an instance must handle during peak usage periods, as well as the amount of data traffic that an instance must handle during average usage periods.

Figures 5, 6:
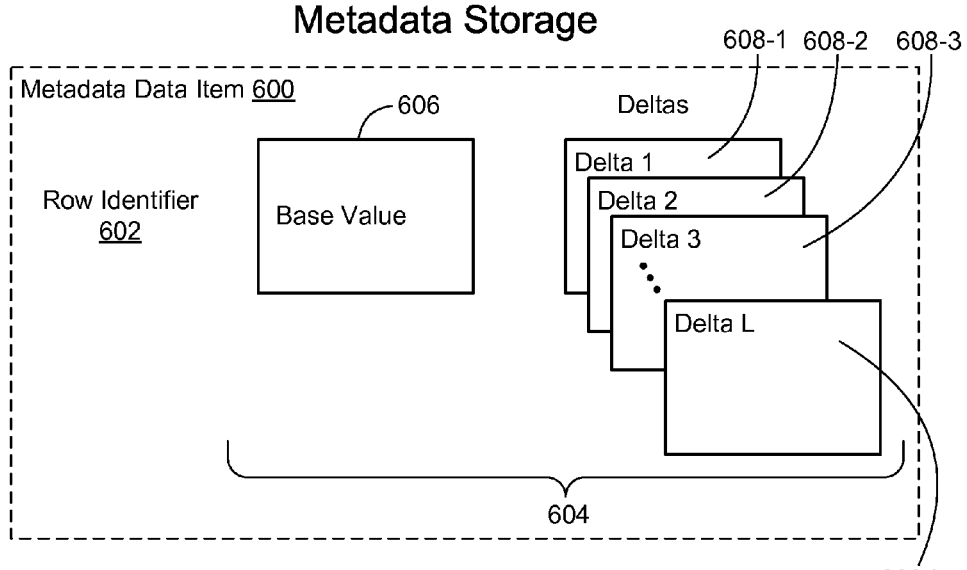
FIG. 5 illustrates a typical allocation of instance servers to various programs or processes illustrated in FIGS. 1B, 2, and 3, according to some embodiments.
FIG. 6 illustrates how metadata is stored according to some embodiments.

To provide faster responses to clients and to provide fault tolerance, each program or process that runs at an instance is generally distributed among multiple computers. The number of instance servers 400 assigned to each of the programs or processes can vary, and depends on the workload. FIG. 5 provides exemplary information about a typical number of instance servers 400 that are assigned to each of the functions. In some embodiments, each instance has about 10 instance servers performing (502) as blobmasters. In some embodiments, each instance has about 100 instance servers performing (504) as bitpushers. In some embodiments, each instance has about 50 instance servers performing (506) as BigTable servers. In some embodiments, each instance has about 1000 instance servers performing (508) as file system servers. File system servers store data for file system stores 216 as well as the underlying storage medium for BigTable stores 214. In some embodiments, each instance has about 10 instance servers performing (510) as tape servers. In some embodiments, each instance has about 5 instance servers performing (512)

as tape masters. In some embodiments, each instance has about 10 instance servers performing (514) replication management, which includes both dynamic and background replication. In some embodiments, each instance has about 5 instance servers performing (516) as quorum clock servers.

FIG. 6 illustrates the storage of metadata data items 600 according to some embodiments. Each data item 600 has a unique row identifier 602. Each data item 600 is a row 604 that has a base value 606 and zero or more deltas 608-1, 608-2, . . . , 608-L. When there are no deltas, then the value of the data item 600 is the base value 606. When there are deltas, the "value" of the data item 600 is computed by starting with the base value 606 and applying the deltas 608-1, etc. in order to the base value. A row thus has a single value, representing a single data item or entry. Although in some embodiments the deltas store the entire new value, in some embodiments the deltas store as little data as possible to identify the change. For example, metadata for a blob includes specifying what instances have the blob as well as who has access to the blob. If the blob is copied to an additional instance, the metadata delta only needs to specify that the blob is available at the additional instance. The delta need not specify where the blob is already located. As the number of deltas increases, the time to read data increases. The compaction process merges the deltas 608-1, etc. into the base value 606 to create a new base value that incorporates the changes in the deltas.

Although the storage shown in FIG. 6 relates to metadata for blobs, the same process is applicable to other non-relational databases, such as columnar databases, in which the data changes in specific ways. For example, an access control list may be implemented as a multi-byte integer in which each bit position represents an item, location, or person. Changing one piece of access information does not modify the other bits, so a delta to encode the change requires little space. In alternative embodiments where the data is less structured, deltas may be encoded as instructions for how to make changes to a stream of binary data. Some embodiments are described in publication RFC 3284, "The VCDIFF Generic Differencing and Compression Data Format," The Internet Society, 2002. One of ordinary skill in the art would thus recognize that the same technique applied here for metadata is equally applicable to certain other types of structured data.

Figure 7:
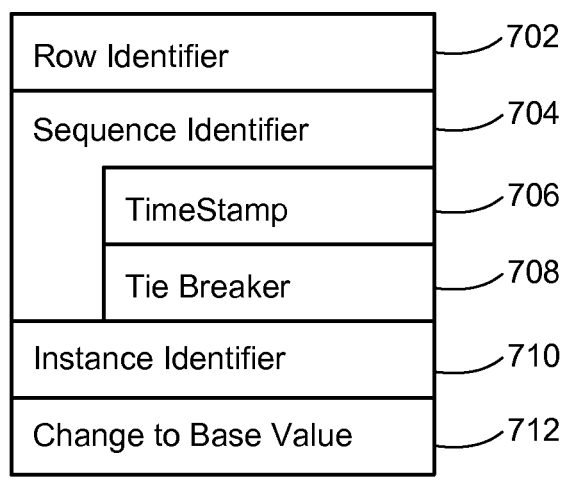
FIG. 7 illustrates an data structure that is used to store deltas according to some embodiments.

FIG. 7 illustrates an exemplary data structure to hold a delta. Each delta applies to a unique row, so the delta includes the row identifier 702 of the row to which it applies. In order to guarantee data consistency at multiple instances, the deltas must be applied in a well-defined order to the base value. The sequence identifier 704 is globally unique, and specifies the order in which the deltas are applied. In some embodiments, the sequence identifier comprises a timestamp 706 and a tie breaker value 708 that is uniquely assigned to each instance where deltas are created. In some embodiments, the timestamp is the number of microseconds past a well-defined point in time. In some embodiments, the tie breaker is computed as a function of the physical machine running the blobmaster as well as a process id. In some embodiments, the tie breaker includes an instance identifier, either alone, or in conjunction with other characteristics at the instance. In some embodiments, the tie breaker 708 is stored as a tie breaker value 132. By combining the timestamp 706 and a tie breaker 708, the sequence identifier is both globally unique and at least approximately the order in which the deltas were created. In certain circumstances, clocks at different instances may be slightly different, so the order defined by the sequence identifiers may not correspond to the "actual" order of events. However, in some embodiments, the "order," by definition, is the order created by the sequence identifiers. This is the order the changes will be applied at all instances.

A change to metadata at one instance is replicated to other instances. The actual change to the base value 712 may be stored in various formats. In some embodiments, data structures similar to those in FIGS. 8A-8E are used to store the changes, but the structures are modified so that most of the fields are optional. Only the actual changes are filled in, so the space required to store or transmit the delta is small. In other embodiments, the changes are stored as key/value pairs, where the key uniquely identifies the data element changed, and the value is the new value for the data element.

In some embodiments where the data items are metadata for blobs, deltas may include information about forwarding. Because blobs may be dynamically replicated between instances at any time, and the metadata may be modified at any time as well, there are times that a new copy of a blob does not initially have all of the associated metadata. In these cases, the source of the new copy maintains a "forwarding address," and transmits deltas to the instance that has the new copy of the blob for a certain period of time (e.g., for a certain range of sequence identifiers).

FIGS. 8A-8E illustrate data structures that are used to store metadata in some embodiments. In some embodiments, these data structures exist within the memory space of an executing program or process. In other embodiments, these data structures exist in non-volatile memory, such as magnetic or optical disk drives. In some embodiments, these data structures form a protocol buffer, facilitating transfer of the structured data between physical devices or processes. See, for example, the Protocol Buffer Language Guide, available at http://code.google.com/apis/protocolbuffers/docs/proto.html.

The overall metadata structure 802 includes three major parts: the data about blob generations 804, the data about blob references 808, and inline data 812. In some embodiments, read tokens 816 are also saved with the metadata, but the read tokens are used as a means to access data instead of representing characteristics of the stored blobs.

The blob generations 804 can comprise one or more "generations" of each blob. In some embodiments, the stored blobs are immutable, and thus are not directly editable. Instead, a "change" of a blob is implemented as a deletion of the prior version and the creation of a new version. Each of these blob versions 806-1, 806-2, etc. is a generation, and has its own entry. In some embodiments, a fixed number of generations are stored before the oldest generations are physically removed from storage. In other embodiments, the number of generations saved is set by a blob policy 326. (A policy can set the number of saved generations as 1, meaning that the old one is removed when a new generation is created.) In some embodiments, removal of old generations is intentionally "slow," providing an opportunity to recover an old "deleted" generation for some period of time. The specific metadata associated with each generation 806 is described below with respect to FIG. 8B.

Blob references 808 can comprise one or more individual references 810-1, 810-2, etc. Each reference is an independent link to the same underlying blob content, and each reference has its own set of access information. In most cases there is only one reference to a given blob. Multiple references can occur only if the user specifically requests them. This process is analogous to the creation of a link (a hard link) in a desktop file system. The information associated with each reference is described below with respect to FIG. 8C.

Inline data 812 comprises one or more inline data items 814-1, 814-2, etc. Inline data is not "metadata"—it is the actual content of the saved blob to which the metadata applies. For blobs that are relatively small, access to the blobs can be optimized by storing the blob contents with the metadata. In this scenario, when a client asks to read the metadata, the blobmaster returns the actual blob contents rather than read tokens 816 and information about where to find the blob contents. Because blobs are stored in the metadata table only when they are small, there is generally at most one inline data item 814-1 for each blob. The information stored for each inline data item 814 is described below in FIG. 8D.

Figure 8A:
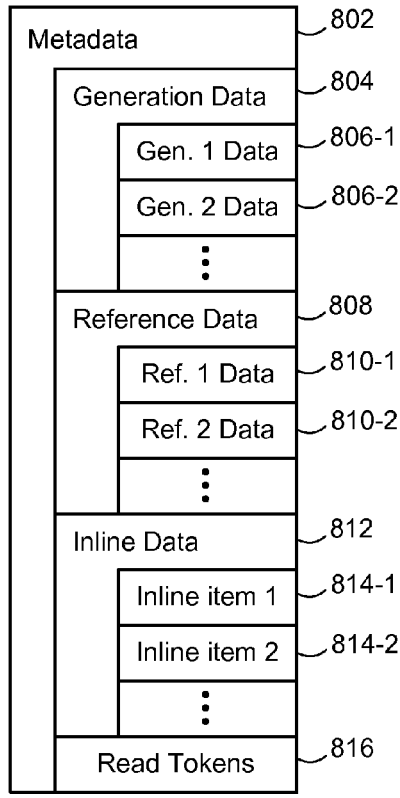
FIGS. 8A-8E illustrate data structures used to store metadata according to some embodiments.
Figure 8B:
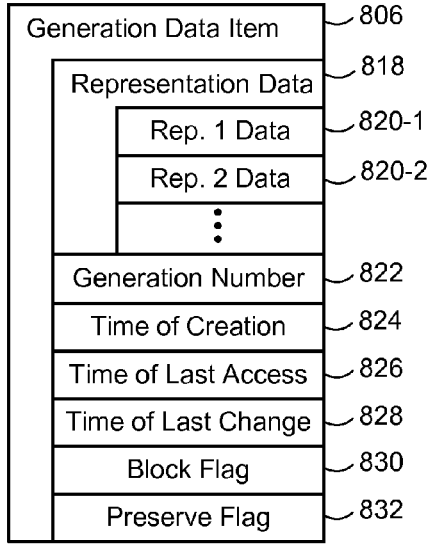

As illustrated in the embodiment of FIG. 8B, each generation 806 includes several pieces of information. In some embodiments, a generation number 822 (or generation ID) uniquely identifies the generation. The generation number can be used by clients to specify a certain generation to access. In some embodiments, if a client does not specify a generation number, the blobmaster 204 will return information about the most current generation. In some embodiments, each generation tracks several points in time. Specifically, some embodiments track the time the generation was created (824). Some embodiments track the time the blob was last accessed by a user (826). In some embodiments, last access refers to end user access, and in other embodiments, last access includes administrative access as well. Some embodiments track the time the blob was last changed (828). In some embodiments that track when the blob was last changed, changes apply only to metadata because the blob contents are immutable. Some embodiments provide a block flag 830 that blocks access to the generation. In these embodiments, a blobmaster 204 would still allow access to certain users or clients who have the privilege or seeing blocked blob generations. Some embodiments provide a preserve flag 832 that will guarantee that the data in the generation is not removed. This may be used, for example, for data that is subject to a litigation hold or other order by a court. In addition to these individual pieces of data about a generation, a generation has one or more representations 818. The individual representations 820-1, 820-2, etc. are described below with respect to FIG. 8E.

Figure 8C:
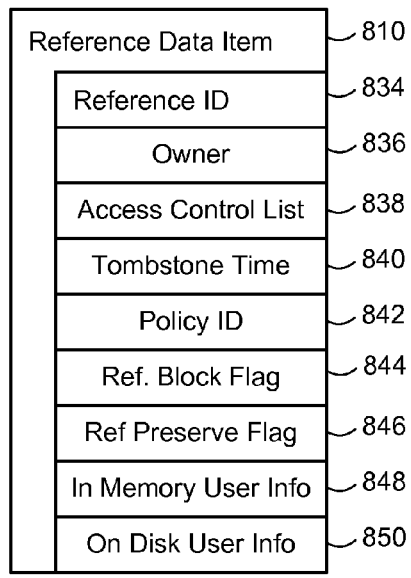

FIG. 8C illustrates a data structure to hold an individual reference according to some embodiments. Each reference 810 includes a reference ID 834 that uniquely identifies the reference. When a user 302 accesses a blob, the user application 308 must specify a reference ID in order to access the blob. In some embodiments, each reference has an owner 836, which may be the user or process that created the reference. Each reference has its own access control list ("ACL"), which may specify who has access to the blob, and what those access rights are. For example, a group that has access to read the blob may be larger than the group that may edit or delete the blob. In some embodiments, removal of a reference is intentionally slow, in order to provide for recovery from mistakes. In some embodiments, this slow deletion of references is provided by tombstones. Tombstones may be implemented in several ways, including the specification of a tombstone time 840, at which point the reference will be truly removed. In some embodiments, the tombstone time is 30 days after the reference is marked for removal. In some embodiments, certain users or accounts with special privileges can view or modify references that are already marked with a tombstone, and have the rights to remove a tombstone (i.e., revive a blob).

In some embodiments, each reference has its own blob policy, which may be specified by a policy ID 842. The blob policy specifies the number of copies of the blob, where the copies are located, what types of data stores to use for the blobs, etc. When there are multiple references, the applicable "policy" is the union of the relevant policies. For example, if one policy requests 2 copies, at least one of which is in Europe, and another requests 3 copies, at least one of which is in North America, then the minimal union policy is 3 copies, with at least one in Europe and at least one in North America. In some embodiments, individual references also have a block flag 844 and preserve flag 846, which function the same way as block and preserve flags 830 and 832 defined for each generation. In addition, a user or owner of a blob reference may specify additional information about a blob, which may include on disk information 850 or in memory information 848. A user may save any information about a blob in these fields.

Figure 8D:
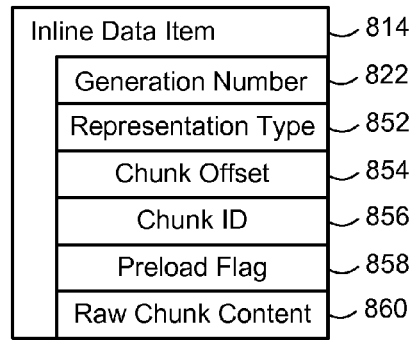

FIG. 8D illustrates inline data items 814 according to some embodiments. Each inline data item 814 is assigned to a specific generation, and thus includes a generation number 822. The inline data item also specifies the representation type 852, which, in combination with the generation number 822, uniquely identifies a representation item 820. (See FIG. 8E and associated description below.) In embodiments that allow multiple inline chunks for one blob, the inline data item 814 also specifies the chunk ID 856. In some embodiments, the inline data item 814 specifies the chunk offset 854, which specifies the offset of the current chunk from the beginning of the blob. In some embodiments, the chunk offset is specified in bytes. In some embodiments, there is a Preload Flag 858 that specifies whether the data on disk is preloaded into memory for faster access. The contents 860 of the inline data item 814 are stored with the other data elements.

Figure 8E:
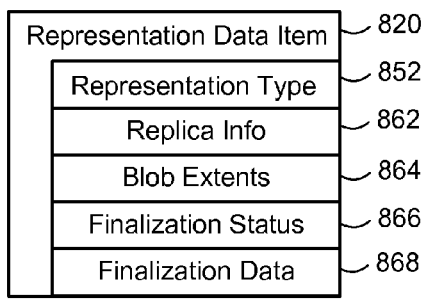

FIG. 8E illustrates a data structure to store blob representations according to some embodiments. Representations are distinct views of the same physical data. For example, one representation of a digital image could be a high resolution photograph. A second representation of the same blob of data could be a small thumbnail image corresponding to the same photograph. Each representation data item 820 specifies a representation type 852, which would correspond to "high resolution photo" and "thumbnail image" in the above example. The Replica Information 862 identifies where the blob has been replicated, the list of storage references (i.e., which chunk stores have the chunks for the blob). In some embodiments, the Replica Information 862 includes other auxiliary data needed to track the blobs and their chunks. Each representation data item also includes a collection of blob extents 864, which specify the offset to each chunk within the blob, to allow reconstruction of the blob.

When a blob is initially created, it goes through several phases, and some embodiments track these phases in each representation data item 820. In some embodiments, a finalization status field 866 indicates when the blob is UPLOADING, when the blob is FINALIZING, and when the blob is FINALIZED. Most representation data items 820 will have the FINALIZED status. In some embodiments, certain finalization data 868 is stored during the finalization process.

As described above in connection with FIGS. 1 and 3, a distributed storage system 200 may includes multiple instances 102 and a particular instance 102 may include multiple data stores based on different types of storage media, one of which being a tape store 218 that is configured to store data on a physical tape 320 as a backup for the other data stores. In light of the features associated with a tape medium (e.g., serial access only and low throughput, etc.), special approaches are developed for the tape store 218 to make these tape-related features less visible such that the tape store 218 can be treated in effectively the same manner as the other types of data stores like the bigtable store 214 and the file store 216.

Figure 9A:
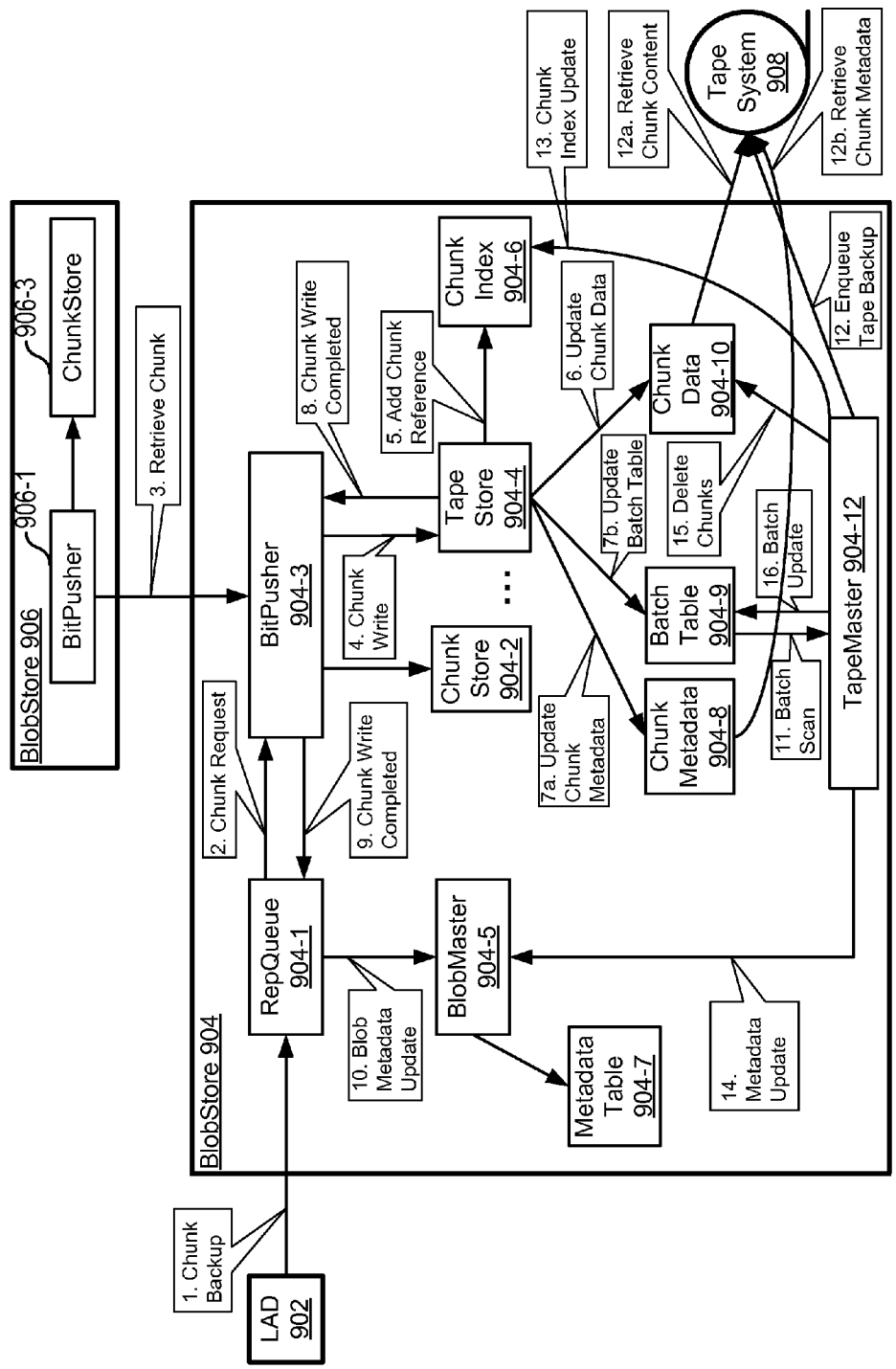
Figure 9B:
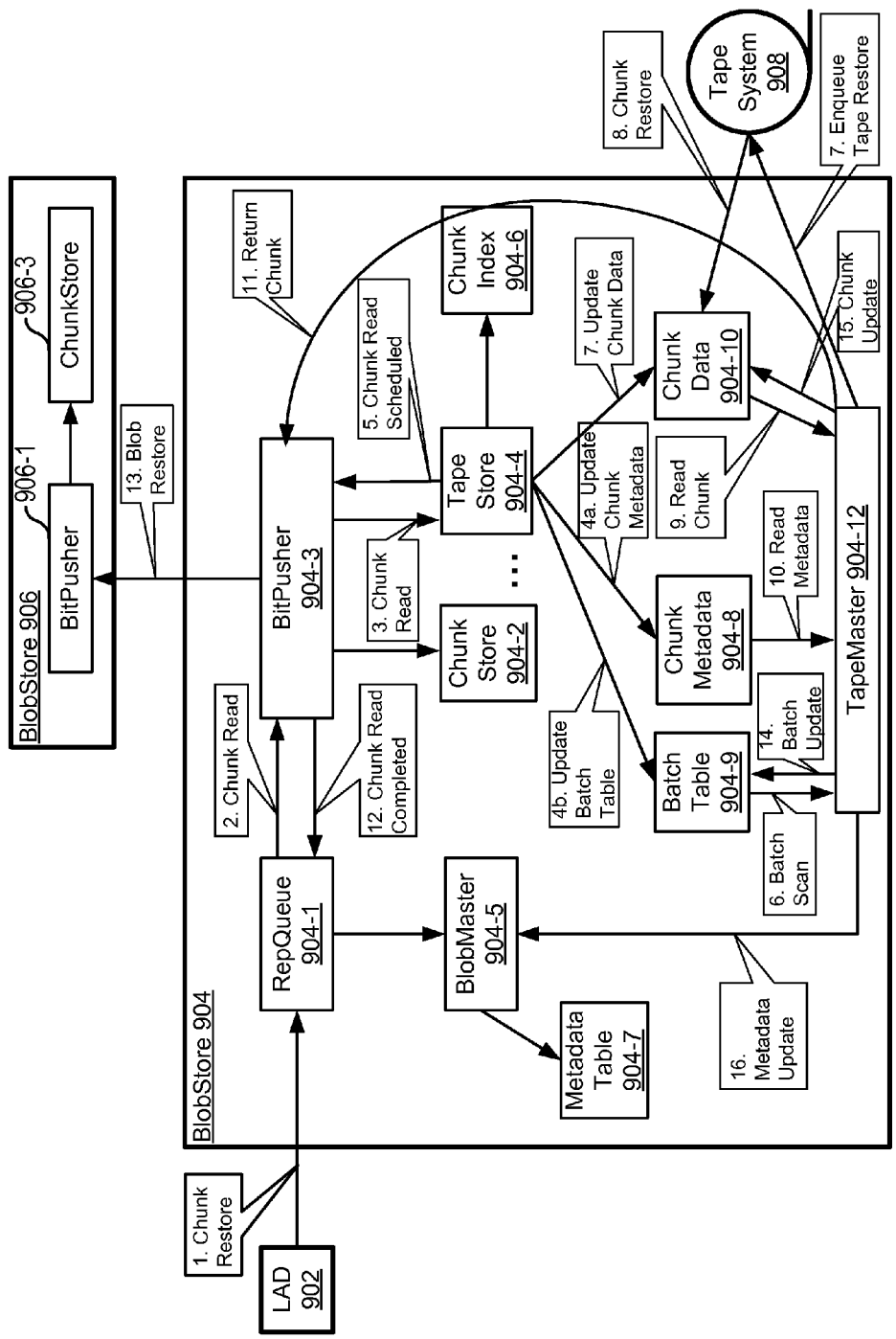
Figure 9C:
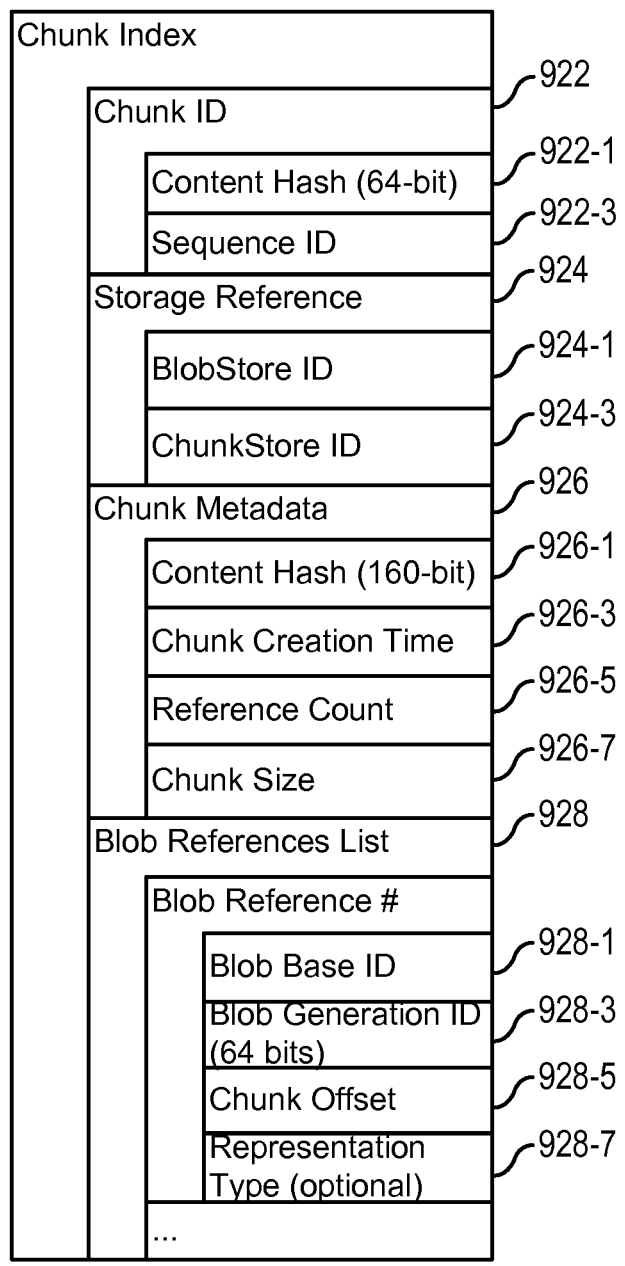
Figure 10A:
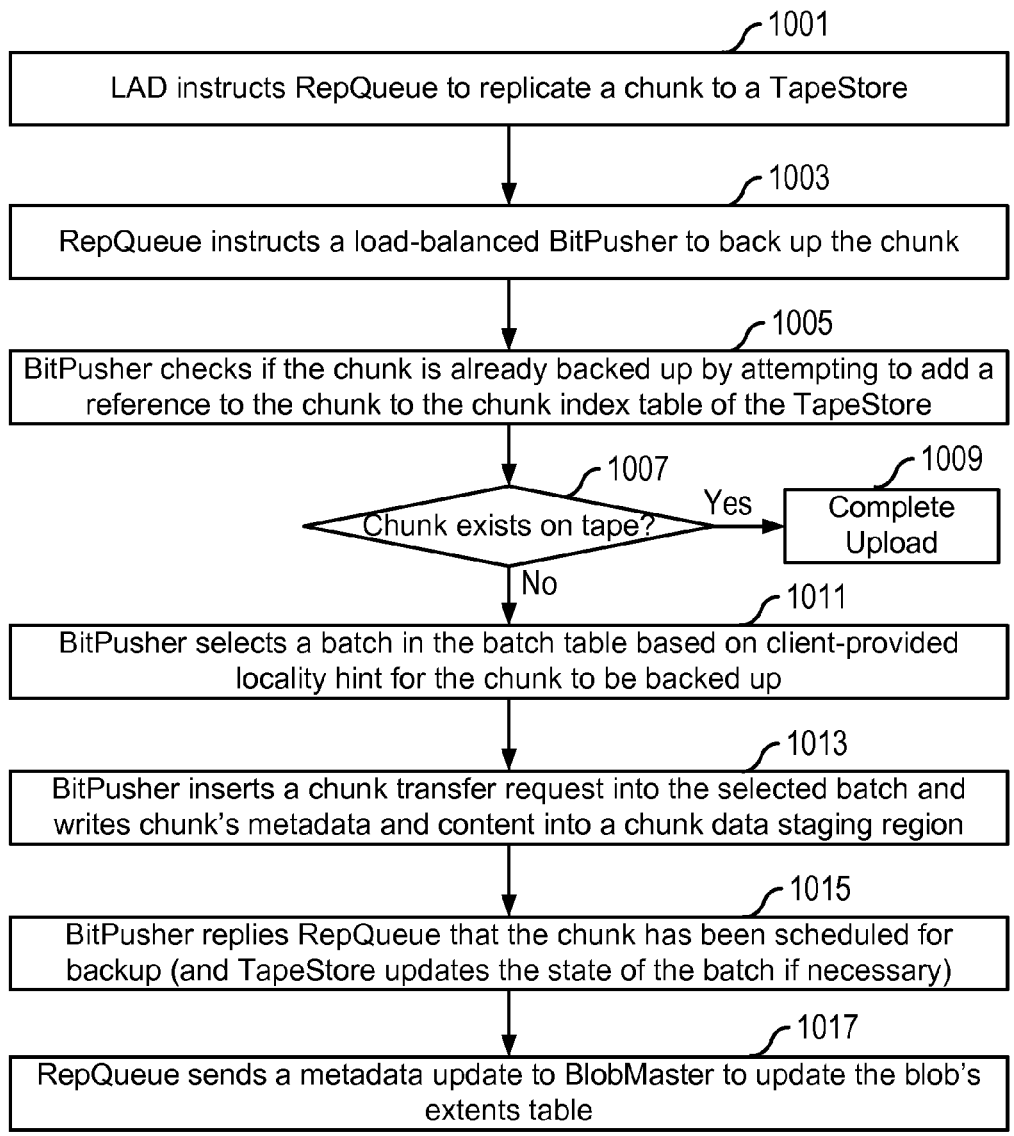
FIGS. 10A-10D illustrate flow charts of computer-implemented methods used for replicating data between a planetary-scale distributed storage system and a tape storage system according to some embodiments.
Figure 10B:
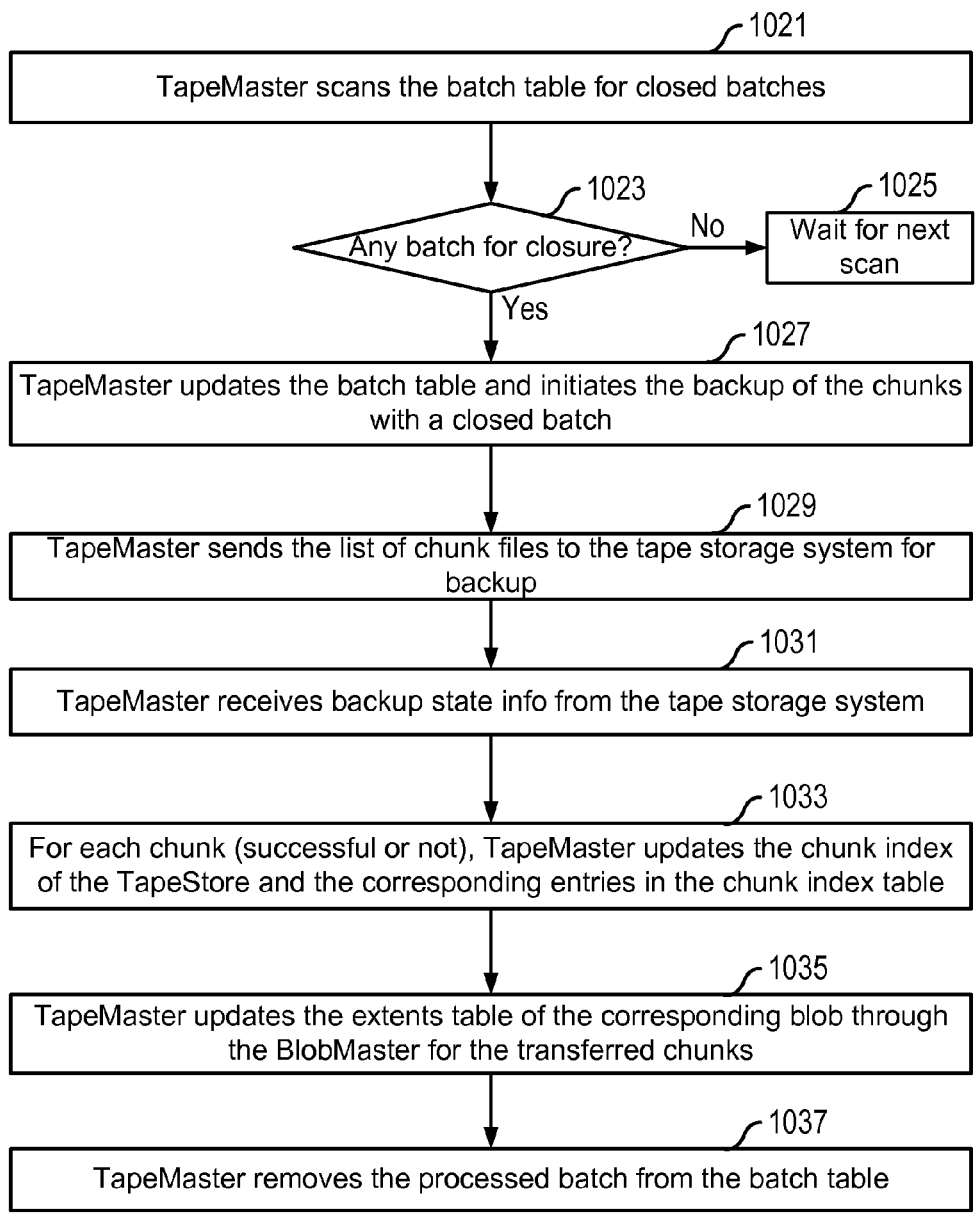
Figure 10C:
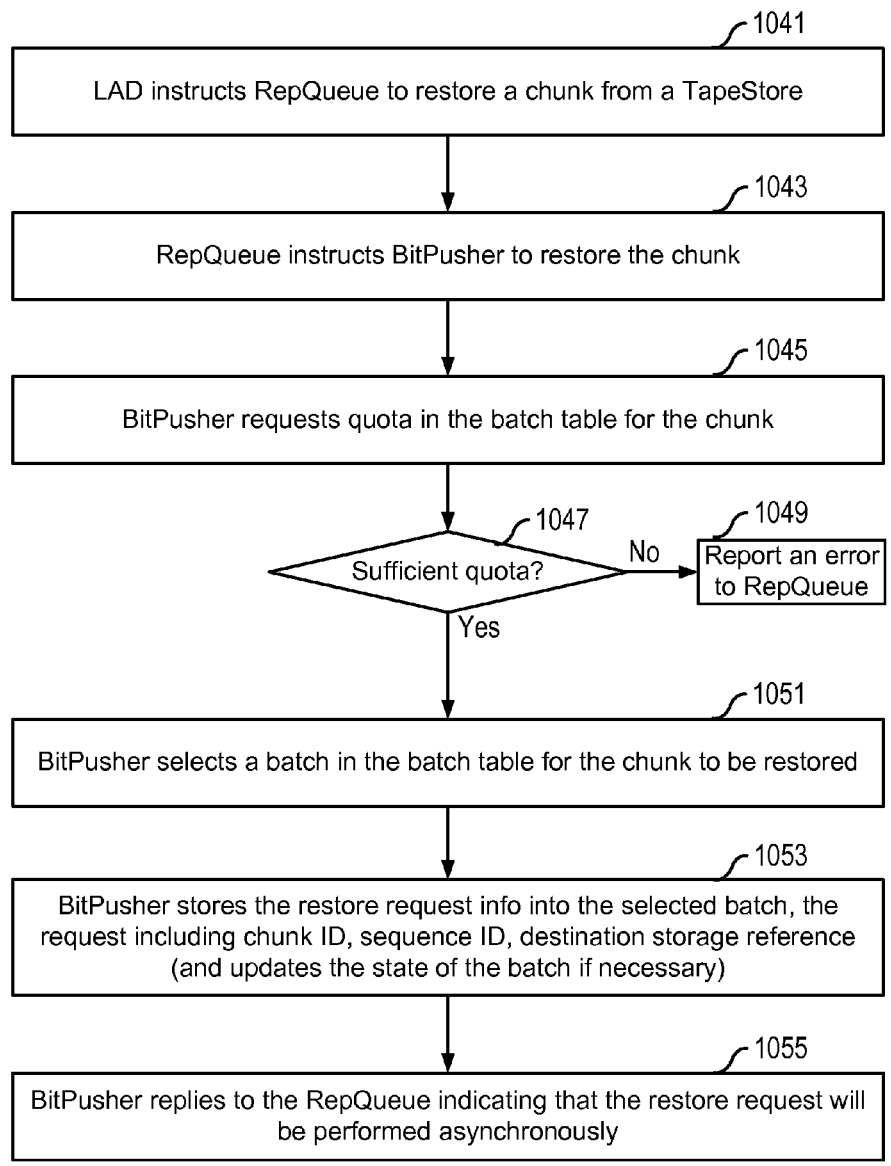
Figure 10D:
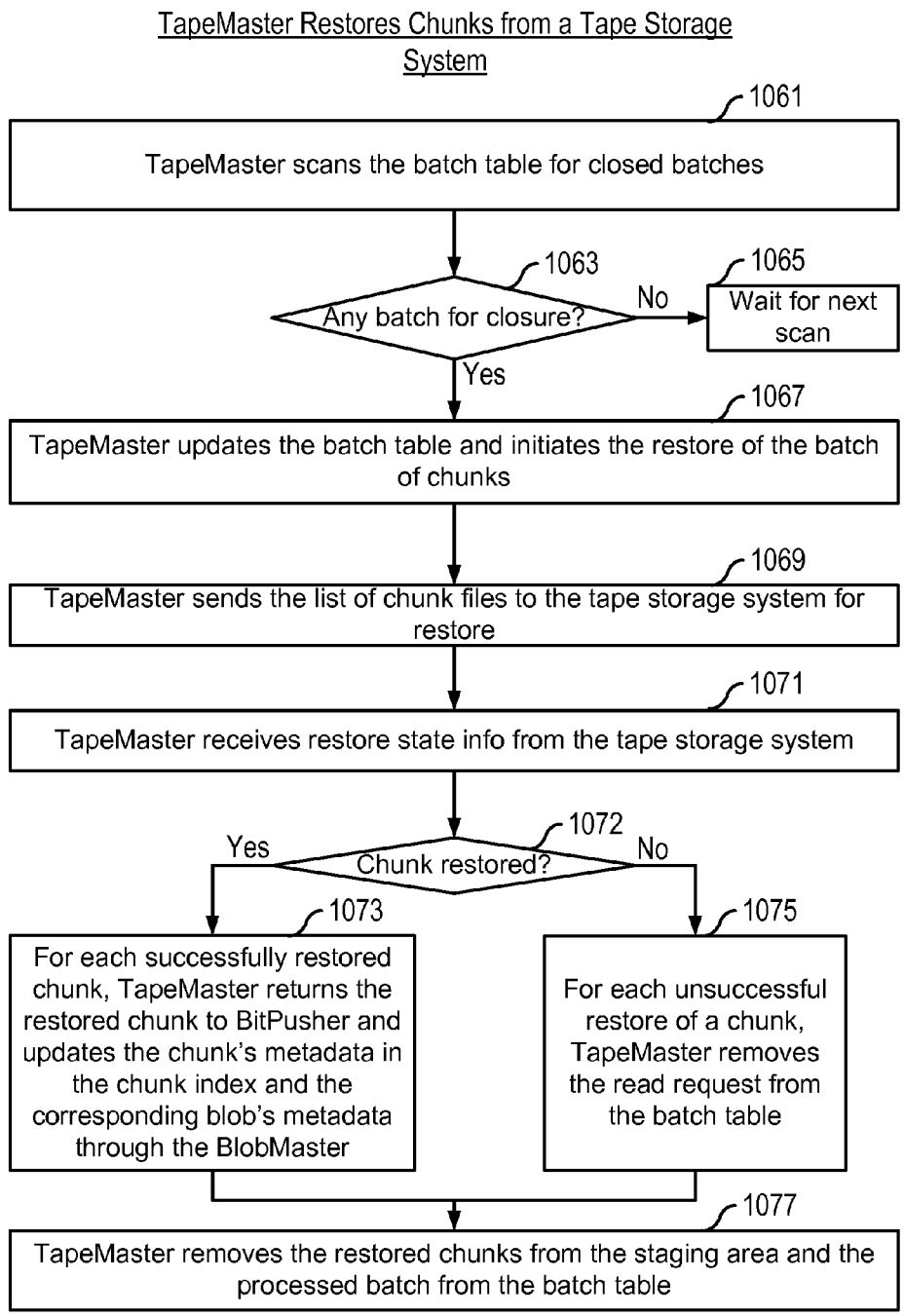

In particular, FIG. 9A depicts a block diagrams illustrative of how a chunk is transferred from a distributed storage system to a tape storage system with FIGS. 10A and 10B showing the corresponding flowcharts of the chunk backup process. FIG. 9B depicts how a chunk is restored from the tape storage system back to the distributed storage system with FIGS. 10C and 10D showing the corresponding flowcharts of the chunk restore process. FIGS. 9C-9F depict block diagrams of data structures used by different components of the distributed storage system to support the back and forth chunk replication between the distributed storage system to the tape storage system.

For illustrative purposes, FIGS. 9A and 9B only depict a subset of components of the distributed storage system 200 as shown in FIGS. 1 and 3, including the LAD 902 and two blobstores 904, 906. In this example, the blobstore 904 is coupled to a tape storage system 908 that may be external to the distributed storage system 200 in some embodiments or part of the distributed storage system 200 in some other embodiments. Note that the term "blobstore" in this application corresponds to an instance 102 of the system 200 because it stores a plurality of blobs, each blob being a data object (e.g., an image, a text document, or an audio/video stream) that is comprised of one or more chunks.

As shown in FIG. 9A, the LAD 902 determines that a chunk associated with a blob should be backed up onto a tape and then issues a chunk backup request including an identifier of the chunk to the repqueue 904-1 of the blobstore 904 (1001 of FIG. 10A). Note that the term "repqueue" is a collective representation of a replication module 224 and its associated queues 226 as shown in FIG. 3. In some embodiments, the LAD 902 may make this decision in accordance with the blob's replication policy that requires a replica of the blob being stored in a tape storage system as a backup. In some other embodiments, the chunk backup request may be initiated by a client residing with an application (e.g., the client 310 inside the user application 308 as shown in FIG. 3). Since the distributed storage system 200 includes multiple blobstores, the LAD 902 typically issues the request to a load-balanced blobstore that has access to tape storage. As part of the chunk backup request, the LAD 902 also identifies a source storage reference that has a replica of the chunk to be backed up. Depending on where the replica is located, the source storage reference may be a chunk store within the same blobstore that receives the backup request or a different blobstore. In this example, it is assumed that the replica is within the blobstore 906.

The repqueue 904-1 then issues a chunk write request to a load-balanced bitpusher 904-3 (1003 of FIG. 10A). In some embodiments, this step involves the process of adding the request to a particular queue of tasks to be performed by the blobstore's bitpushers in accordance with the priority of the backup request that the LAD 902 has chosen. In this case, the chunk write request may reach the bitpusher 904-3 at a later time if the backup request has a relatively low priority.

In some embodiments, to reduce chunk duplicates on the tape storage system, the bitpusher 904-1 may check whether the chunk is already backed up upon receipt of the chunk backup or write request (1005 of FIG. 10A). In some embodiments, the bitpusher 904-1 does so by attempting to add a reference to the chunk using the chunk identifier and its source storage reference to the chunk index table 904-6 of the tape store 904-4. In some embodiments, the chunk index table 904-6 includes a plurality of chunk index records, each record identifying a chunk that has been backed up or scheduled to be backed up by the tape storage system. In some other embodiments, the chunk index table 904-6 only includes chunk index records for those chunks that have been backed up by the tape storage system.

FIG. 9C illustrates the data structure of an exemplary chunk index record 920. Each chunk index record 920 has a globally unique chunk ID 922. In some embodiments, the chunk ID 922 is a function of a hash of the chunk's content 922-1 and a sequence ID 922-3 assigned to a particular incarnation of the chunk, e.g., the creation timestamp of the incarnation. The chunk index record 920 includes a storage reference 924, which is a function of a blobstore ID 924-1 and a chunk store ID 924-3. The chunk metadata 926 of the chunk index record 920 includes: another hash of the chunk's content 926-1; a chunk creation time 926-3; a reference count 926-5; and a chunk size 926-7. The blob references list 928 of the chunk index record 920 identifies a set of blobs each of which considers the chunk as part of the blob. Each blob reference is identified by a combination of a blob base ID 928-1 and a blob generation ID 928-3. The blob reference also keeps a chunk offset 928-5 indicating the position of the chunk within the blob and an optional representation type 928-7.

Based on the chunk ID provided by the repqueue 904-1, the bitpusher 904-3 queries the chunk index table 904-6 for a chunk index record corresponding to the given chunk ID. If the chunk index record is indeed found (yes, 1007 of FIG. 10A), the reference count 926-5 of the chunk is increased by one and a new entry may be added to the blob references list 928 identifying another blob that considers the chunk as part of the blob. The tape store 904-4 then sends a response to the bitpusher 904-3, indicating that the chunk backup/write operation is complete (1009 of FIG. 10A). The bitpusher 904-3 then forwards the response back to the repqueue 904-1, which then sends a blob metadata update to the blobmaster 904-5.

Returning to FIG. 9A, assuming that it is the first tape backup request for the chunk (no, 1007 of FIG. 10A), the bitpusher 904-3 then requests the chunk from a bitpusher 906-1 at the blobstore 906. In response, the bitpusher 906-1 retrieves the requested chunk from a corresponding chunk store 906-3 and returns it to the bitpusher 904-3 at the blobstore 904. Instead of directly uploading the chunk into the tape storage system 908, the bitpusher 904-3 places the chunk in a staging area of the tape store 904-4 with other chunks scheduled to be backed up. At a later time, the tape master 904-12 is triggered to upload the chunks into the tape storage system 908 in a batch mode.

As shown in FIG. 9A, the staging area of the tape store 904-4 is composed of three components: a batch table 904-9, a chunk metadata staging region 904-8 (e.g., a file directory or a bigtable), and a chunk data staging region 904-10 (e.g., a file directory). In some embodiments, given a chunk to be backed up, the bitpusher 904-3 generates a chunk transfer entry and inserts the chunk transfer entry into the batch table. The chunk transfer entry includes a reference to a file in the chunk data staging region that contains a list of chunks to be backed up. In addition, the bitpusher 904-3 writes the chunk's backup metadata into the chunk metadata staging region 904-8 and the chunk's content into a file in the chunk data staging region 904-10.

FIGS. 9D-9F illustrate the data structures of an exemplary batch table record 930, a chunk backup record 950, and a chunk restore record 960, respectively. A batch table record within the batch table 904-9 has the following attributes: a unique batch ID 932, a batch type 934 (backup or restore), a locality range 936 (start, limit), a current batch state 938, a batch creation time 940, a tape storage system job status 942, a chunk files list 944, and a batch size 946. A more detailed description of the attributes is provided blow. A chunk backup metadata record 950 includes the following attributes: a chunk ID 954 and a blob back reference 956 that further includes: a blob base ID 956-1, a chunk offset within the blob 956-3, a chunk size 956-5, a representation type 956-7, and a blob generation ID 956-9. A chunk restore metadata record 960 includes the following attributes: a chunk ID 964 and a blob back reference 966 that further includes: a blob base ID 956-1, a chunk offset within the blob 956-3, a chunk size 956-5, a representation type 956-7, and a blob generation ID 956-9. Note that a combination of a blob based ID and a blob generation ID can uniquely identify a particular generation of a blob that includes the chunk.

As shown in FIG. 9D, the batch table 904-9 includes multiple batches and each batch includes a list of chunk files to be backed up or restored. For a given chunk to be backed up, the bitpusher 904-3 needs to identify one of the multiple batches for the chunk to be backed up on the tape storage system (1011 of FIG. 10A). In some embodiments, the bitpusher 904-3 chooses the batch by comparing a locality hint provided with the chunk back up request with the batch's locality range. In some embodiments, the locality hint provided by the LAD 902 or another client indicates a group of chunks that should be restored together with the chunk in one batch or a group of chunks that should expire together with the chunk. Based on the comparison result, the bitpusher 904-3 identifies a batch whose locality range matches most the chunk's locality hint and inserts a new chunk transfer entry into the identified batch as well as writing the chunk's backup metadata and content into respective files in the corresponding chunk data staging region (1013 of FIG. 10A). In some embodiments, the metadata includes a hash of the chunk used by the tape storage system 908. In some embodiments, if the chosen batch's size reaches a threshold or the chosen batch has been open for at least a predefined time period, the bitpusher 904-3 may close the batch and create a new batch for the chunk to be backed up.

Note that after a chunk is stored in the chunk data staging region and a corresponding chunk transfer entry is entered into the batch table 904-9, the responsibility for uploading the chunk into the tape storage system 908 is shifted from the bitpusher 904-3 to the tape master 904-12. Thus, it is safe for the repqueue 904-1 as well as the blobstore 906 to assume that the chunk backup has been completed. In other words, although the chunk may have not been physically replicated onto a tape, it is presumed to be on tape from the perspective of the distributed storage system. Accordingly, the bitpusher 904-3 sends a response to the repqueue 904-1 and possibly the bitpusher 906-1 indicating that the chunk has been scheduled for backup (1015 of FIG. 10A). In some embodiments, the latency between the bitpusher 904-3 sending the response and the chunk being backed up on the tape storage system 908 may range from a few minutes to multiple hours. Upon receipt of the response, the repqueue 904-1 may send a blob metadata update to the blobmaster 904-5 to update the blob's extents table within the metadata table 904-7 (1017 of FIG. 10A). In some embodiments, a similar set of operations may be performed at the blobstore 906. For example, a previous request to delete a blob including the chunk that was suspended due to the blob's "in transfer" state may resume after the blob's state returns to be "finalized."

As noted above, the tape master 904-12 is responsible for periodically uploading the chunks from the staging area of the distributed storage system to the tape storage system 908 in a batch mode. In some embodiments, the tape master 904-12 scans the batch table 904-9 for batches closed by the bitpusher 904-3 or open batches that meet one or more predefined batch closure conditions (1021 of FIG. 10B). For example, a batch may be closed if the batch's size or its open time period since creation exceeds a predefined threshold. If the tape master 904-12 identifies no batch for further process (no, 1023 of FIG. 10B), it waits for a predefined time period before the next scan of the batch table 904-9 (1025 of FIG. 10B). If the tape master 904-12 identifies a closed batch or a batch that is ready to be closed (yes, 1023 of FIG. 10B), it will update the current batch state of the batch record in the batch table 904-9 and initiate the process of uploading the files associated with the closed batch into the tape storage system 908 (1027 of FIG. 10B). In some embodiments, the tape master also opens a new batch in the batch table after closing an old one.

In some embodiments, the tape master 904-12 extracts the list of chunk files from the batch table 904-9 and sends the list to the tape storage system 908 for chunk backup (1029 of FIG. 10B). As noted above, each chunk is divided into two parts, the metadata being stored in one file and the content being stored in another file. Therefore, for each chunk, the tape storage system 908 uses the two file names provided by the tape master 904-12 to retrieve the metadata from the chunk metadata region 904-8 and the content from the chunk data region 904-10. In some embodiments, the chunk metadata region 904-8 and 904-10 are combined together into a single staging region and the two files are also merged into a single file per chunk that includes a unique key name, the actual chunk data, and a checksum for the chunk. In some embodiments, the tape storage system 908 keeps one copy for each chunk on the tape. For security, a private key is used for encrypting the chunk and the private key is kept on a separate tape such that a chunk deletion request is honored by deleting the private key. The tape storage system 908 may repeat the retrieval process until either it receives the chunk or it has tried for at least a predefined number of times. In either case, the tape storage system 908 sends a backup status for each file back to the tape master 904-12 (1031 of FIG. 10B). The tape master 904-12 then uses the status information to update the batch table (e.g., the tape system job status attribute 942 of the batch table record 920).

In some embodiments, the tape master 904-12 also updates the chunk index table 904-6 for each chunk processed by the tape storage system regardless of whether the backup succeeds or not (1033 of FIG. 10B). For example, the bitpusher 904-3 may insert an entry into the chunk index table 904-6 for each chunk it plays into the staging area. Initially, the entry is marked as "Staging," indicating that the chunk has not yet been transferred to the tape storage system 908. After the tape master 904-12 receives the backup status from the tape storage system 908, the tape master 904-12 either changes the state of the entry in the chunk index table 904-6 from "Staging" to "External" (if the backup succeeds) or deletes the entry from the chunk index table 904-6 (if the backup fails). As noted above, the entries in the chunk index table 904-6 (more specifically, the "reference count" attribute) are used by the bitpusher 904-3 to determine whether a chunk backup request is a new request or a repeated request.

In some embodiments, for each successfully backed up chunk, the tape master 904-12 also updates the extents table of the corresponding blob through the blobmaster 904-5 (1035 of FIG. 10B). Through subsequent metadata replication, the existence of the chunk in the tape storage system (in the form of a replica of blob) will be spread out to the instances or blobstores of the distributed storage system. In some embodiments, the tape master 904-12 also deletes the chunk metadata file and the chunk content file from the staging area for each successfully backed up chunk to leave the space for subsequent chunk backup or restore tasks. After the last chunk within a batch is processed, the tape master 904-12 may remove the batch from the batch table 904-9 to conclude a batch of chunk backup requests (1037 of FIG. 10C).

In some embodiments, the tape storage system 908 divides a chunk into multiple (e.g., four) segments and generates a redundancy segment from the multiple segments such that a lost segment can be reconstructed from the other segments using approaches such as error correction codes (ECC). Each segment (including the redundancy segment) is kept at a separate tape for security and safety reasons. When the tapes are transported from one location to another location for long-term storage, tapes corresponding to different chunk segments are shipped by different vehicles such that any tape loss due to an accident can be recovered from the other tapes that are shipped separately.

When a client issues a request to delete a chunk, the bitpusher 904-3 deletes a reference to the chunk from the chunk index table 904-6 and reduces the chunk's reference count by one. Once the chunk's reference count reaches zero, the corresponding chunk index record may be deleted from the chunk index table 904-6. In this case, the tape master 904-12 may issue a delete request to the tape storage system 908 to delete the chunk from the tape storage system. As noted above, the tape storage system 908 manages a private key for each chunk backed up on tape. Upon receipt of the delete request, the tape storage system 908 can simply eliminate the private key, indicating the expiration of the chunk. As a result, a "hole" corresponding to the expired chunk (or more specifically, the encrypted segment of the expired chunk) may be left on the tape. Periodically, the tape storage system 908 reads back the chunk segments using the private keys for the valid chunks from the different tapes and rewrites the chunk segments back to the tapes using the same approach as described above. In doing so, the space occupied by the expired chunks is reclaimed by valid chunks and the chunk redundancy is kept intact.

One reason for replicating chunks on the tape storage system is to restore the chunks. This may happen when one or more instances of the distributed storage system become unavailable due to a catastrophic accident and the LAD determines that restoring chunks from the tape storage system is necessary. Note that although tape is a serial access medium, restoring chunks from the tape storage system can happen at a chunk level, not at a tape level, partly because the chunks that are likely to be restored together have been grouped into one batch at the time of chunk backup operation.

FIG. 9B is a block diagram that is similar to the one in FIG. 9A except that FIG. 9B illustrates the process of restoring a chunk from the tape storage system 908. Therefore, many embodiments described above in connection with the tape backup process are also applicable in the tape restore process. Initially, the LAD 902 instructs the repqueue 904-1 of the blobstore 904 to restore a chunk from the tape storage system 908 (1041 of FIG. 10C). The instruction may include the chunk ID and a destination storage reference for hosting the restored chunk. The repqueue 904-1 then issues a request (e.g., a remote procedure call) to a load-balanced bitpusher 904-3 to restore the chunk (1043 of FIG. 10C). The bitpusher 904-3 requests quota for the chunk in the batch table 904-9 (1045 of FIG. 10C). If the batch table 904-9 does not have sufficient quota (no, 1047 of FIG. 10C), the bitpusher 904-3 may send an error notification to the repqueue 904-1 (1049 of FIG. 10C), which can submit a quota request to a quota server (not shown in FIG. 10C) to get the necessary quota for the chunk replication to continue.

Assuming that the batch table 904-9 does have sufficient quota (yes, 1047 of FIG. 10C), the bitpusher 904-3 selects a batch in the batch table 904-9 for the chunk to be restored (1051 of FIG. 10C). In some embodiments, this step is followed by inserting information such as the chunk ID, sequence ID, and the destination storage reference into a corresponding batch table record in the batch table or a bigtable in the chunk metadata staging region 904-8 (1053 of FIG. 10C). In some embodiments, the bitpusher 904-3 also closes a batch that is ready for closure and opens a new batch for subsequent tape-related operations in the staging area. At this point, the responsibility for restoring the chunks identified in the batch table 904-9 is transferred from the bitpusher 904-3 to the tape mater 904-12. Thus, the bitpusher 904-3 sends a response to the repqueue 904-1 indicating that the chunk restore request has been scheduled and will be performed asynchronously at a later time (1055 of FIG. 10C). Upon receipt of the response, the repqueue 904-1 may send metadata updates to the blobmaster 904-5 at the blobstore 904 as well as the blobmaster at the blobstore 906 (which is assumed to be destination storage reference in this example). In some embodiments, the latency between the bitpusher 904-3 providing the response acknowledging the receipt of the chunk restore request and the bitpusher 904-3 providing the requested chunk may range from a few minutes to a few days partly depending on when the chunk was backed up. The most recent the backup the short the latency between the two steps.

Similar to the chunk backup process described above, the tape master 904-12 periodically scans the batch table for closed batches or batches that are ready for closure (1061 of FIG. 10D). If no batch is identified (no, 1063 of FIG. 10D), the tape master 904-12 then waits for the next scan (1065 of FIG. 10D). For each closed batch or a batch that is ready for closure (yes, 1063 of FIG. 10D), the tape master 904-12 retrieves the chunk IDs and a list of chunk file names from the corresponding batch table record in the batch table 904-9 and updates the batch table if necessary (1067 of FIG. 10D). As noted above, each chunk scheduled for backup or restoration has two components, one component stored in a bigtable within the chunk metadata region 904-8 for storing the chunk's restore metadata (a chunk restore metadata record 960 is depicted in FIG. 9F) and the other component (including the chunk's key, content data, and hash) stored in a file within the chunk content data region 904-10 for storing the chunk's content. Based on the chunk IDs (in addition to the chunk sequence IDs), the tape storage system 908 identifies one or more tapes that store those chunks and then writes the chunks back to the staging area of the distribute storage system using the list of chunk file names.

In some embodiments, the tape storage system 908 sends a job status report to the tape master 904-12 regarding the restore state of each file identified in the batch (1071 of FIG. 10D). For each successfully restored chunk of each file, the tape master 908-12 retrieves the chunk's content and metadata from the chunk data region 904-10 and the chunk metadata region 904-8 and sends them to the bitpusher 904-3 (1073 of FIG. 10D). In some embodiments, the restored chunks are stored within a local chunk store before restoring to a remote chunk store for efficiency concern. In some embodiments, the tape master 904-12 updates the chunk index table 904-6 to reflect the new reference to the chunk restored from the tape storage system. In some embodiments, the tape master 904-12 sends a metadata update to the blobmaster 904-5 to update the extents table of the corresponding blob that includes the restored chunk. For each unsuccessful restore of a chunk, the tape master 904-12 removes the original chunk restore request from the batch table (1075 of FIG. 10D). At the end of the process, the tape master 904-12 removes the restored chunks from the staging area and the processed batch from the batch table (1077 of FIG. 10D).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for asynchronously replicating data onto a tape medium, comprising:
    at a computing device having one or more processors and memory storing programs executed by the one or more processors, wherein the computing device is associated with a distributed storage system and connected to a tape storage system:
        receiving a first request from a client to store an object within the tape storage system;
        responsive to receiving the first request:
        scheduling the object to be stored on the tape storage system asynchronously with respect to the first request; and
        during the scheduling, acknowledging, to the first client, the first request as fulfilled;
        wherein scheduling the object to be stored on the tape storage system asynchronously with respect to the first request includes:
            storing the object within a staging sub-system of the distributed storage system, wherein the staging sub-system includes a plurality of objects scheduled to be transferred to the tape storage system;
            transferring one or more objects from the staging sub-system to the tape storage system in accordance with a determination that a predefined condition is met, wherein the predefined condition is at least one of: the one or more objects have a storage size greater than a predefined storage size, and the one or more objects have been in the staging sub-system for a staging time greater than a predefined staging time; and
        for a respective transferred object,
            adding a reference to the object to a tape management sub-system of the tape storage system;
            identifying a corresponding parent object associated with the object and its metadata within a parent object management sub-system of the distributed storage system, wherein the object is a replica of the identified parent object; and
            updating the parent object's metadata to include the object's location within the tape storage system.

2. The computer-implemented method of claim 1, wherein the first request identifies a source storage sub-system of the distributed storage system that has a replica of the object, further comprising:
    upon receipt of the first request,
        submitting a second request for the object to the source storage sub-system; and
        receiving a second response from the source storage sub-system, wherein the second response includes the requested object.

3. The computer-implemented method of claim 1, further comprising:
    before storing the object within the staging sub-system,
        querying the tape management sub-system to determine whether there is a replica of the object within the tape storage system; and
        adding a reference to the replica of the object to the tape management sub-system if there is a replica of the object within the tape storage system.

4. The computer-implemented method of claim 3, wherein the tape management sub-system of the distributed storage system includes a staging object index table and an external object index table, wherein an entry in the staging object index table identifies an object that has been scheduled to be transferred to the tape storage system and an entry in the external object index table identifies an object that has been transferred to the tape storage system.

5. The computer-implemented method of claim 4, wherein:
    there is a replica of the object within the tape storage system if either of the staging and external object index tables includes an entry that corresponds to the object to be transferred to the tape storage system; and
    there is no replica of the object within the tape storage system if neither of the staging and external object index tables includes an entry that corresponds to the object to be transferred to the tape storage system.

6. The computer-implemented method of claim 4, wherein storing the object within the staging sub-system further comprises:
    adding to the staging object index table an entry that corresponds to the object.

7. The computer-implemented method of claim 4, wherein adding a reference to a respective newly-transferred object further comprises:
    removing from the staging object index table an entry that corresponds to the newly-transferred object; and
    adding to the external object index table an entry that corresponds to the newly-transferred object.

8. The computer-implemented method of claim 1, wherein the staging sub-system includes one or more batches of object transfer entries and an object data staging region, and storing the object within the staging sub-system further comprises:
    storing the object to be transferred within the object data staging region;
    identifying a respective batch in accordance with a locality hint provided with the first request, wherein the locality hint identifies a group of objects that are likely to be collectively restored from the tape storage system or expire from the tape storage system;
    inserting an object transfer entry into the identified batch, the object transfer entry identifying a location of the object within the object data staging region; and
    updating a total size of the identified batch in accordance with the newly-inserted object transfer entry and the object to be transferred.

9. The computer-implemented method of claim 8, wherein a respective object to be transferred includes content and metadata, and storing the object within the object data staging region further comprises:
    writing the object's content into a file in the object data staging region and the object's metadata into a bigtable in the object data staging region.

10. The computer-implemented method of claim 1, wherein the first response is provided to the requesting client before the object is transferred to the tape storage system.

11. The computer-implemented method of claim 1, wherein the staging sub-system of the distributed storage system includes one or more batches of object transfer entries and an object data staging region, and transferring one or more objects from the staging sub-system to the tape storage system further comprises:
 periodically scanning the one or more batches to determine their respective states;
 identifying a respective batch of object transfer entries if a total size of the batch reaches a predefined threshold or the batch has been opened for at least a predefined time period;
 closing the identified batch from accepting any more object transfer entry;
 submitting an object transfer request to the tape storage system for the identified batch; and
 for a respective object transfer entry within the identified batch,
  retrieving the corresponding object from the object data staging region; and
  transferring the object into the tape storage system.

12. The computer-implemented method of claim 11, further comprising:
 deleting the identified batch from the staging sub-system after the last object transfer entry within the identified batch is processed.

13. The computer-implemented method of claim 11, wherein the closure of the identified batch triggers a creation of a new batch for incoming object transfer entries in the staging sub-system.

14. The computer-implemented method of claim 11, further comprising:
 for a respective object transfer entry within the identified batch,
  deleting the object transfer entry and the corresponding object from the identified batch and the object data staging region, respectively.

15. The computer-implemented method of claim 1, wherein updating the corresponding parent object's metadata for a respective transferred object further comprise:
 setting the parent object's state as "finalized" if the object is the last object of the parent object to be transferred to the tape storage system; and
 setting the parent object's state as "finalizing" if the object is not the last object of the parent object to be transferred to the tape storage system.

16. A computer-implemented method for asynchronously replicating data from a tape medium, comprising:
 at a computing device having one or more processors and memory storing programs executed by the one or more processors, wherein the computing device is associated with a distributed storage system and connected to a tape storage system:
  receiving a first request from a client to restore an object from the tape storage system to a destination storage sub-system of the distributed storage system;
  responsive to receiving the first request:
   scheduling the object to be restored from the tape storage system asynchronously with respect to the first request; and
   during the scheduling, acknowledging, to the first client, the first request as fulfilled;
   wherein scheduling the object to be restored from the tape storage system asynchronously with respect to the first request includes:
    generating an object restore entry that identifies the object to be restored and the destination storage sub-system;
    storing the object restore entry within a staging sub-system of the distributed storage system, wherein the staging sub-system includes a plurality of object restore entries scheduled to be applied to the tape storage system;
   applying one or more object restore entries within the staging sub-system to the tape storage system in accordance with a determination that a predefined condition is met, wherein the predefined condition is at least one of: one or more objects to be restored have a storage size greater than a predefined storage size, and the one or more objects have been in the staging sub-system for a staging time greater than a predefined staging time; and
   for a respective restored object,
    transferring the object to the destination storage sub-system;
    identifying a corresponding parent object associated with the object and its metadata within a parent object management sub-system of the distributed storage system, wherein the object is a replica of the identified parent object; and
    updating the parent object's metadata to identify the object's location within the destination storage sub-system.

17. The computer-implemented method of claim 16, wherein the staging sub-system includes one or more batches of object restore entries and an object data staging region, and storing the object restore entry within the staging sub-system further comprises:
 identifying a respective batch in accordance with a restore priority provided with the first request;
 inserting the object restore entry into the identified batch; and
 updating a total size of the identified batch in accordance with the newly-inserted object restore entry.

18. The computer-implemented method of claim 16, wherein the first response is provided to the requesting client before the object is restored from the tape storage system.

19. The computer-implemented method of claim 16, wherein the staging sub-system of the distributed storage system includes one or more batches of object restore entries, and applying one or more object restore entries to the tape storage system further comprises:
 periodically scanning the one or more batches to determine their respective states;
 identifying a respective batch of object restore entries if a total size of the batch reaches a predefined threshold or the batch has been opened for at least a predefined time period;
 closing the identified batch from accepting any more object restore entry;
 submitting an object restore request to the tape storage system for the closed batch; and
 for a respective object restore entry within the identified batch,
  retrieving the object from the tape storage system, the object including content and metadata; and
  storing the object within an object data staging region of the staging sub-system, further comprising:
   writing the object's content into a file in the object data staging region and the object's metadata into a bigtable in the object data staging region.

20. The computer-implemented method of claim 19, wherein the closure of the identified batch triggers a creation of a new batch for incoming object restore entries in the staging sub-system.

21. The computer-implemented method of claim 19, wherein transferring a respective restored object to the destination storage sub-system further comprises:
- associating the destination storage sub-system in the object restore entry with the object in the object data staging region;
- sending a request to an object management sub-system, the request identifying the destination storage sub-system and including a copy of the object in the object data staging region;
- deleting the object restore entry and the corresponding object from the identified batch and the object data staging region, respectively.

22. The computer-implemented method of claim 16, wherein updating the corresponding parent object's metadata for a respective restored object further comprise:
- setting the parent object's state as "finalized" if the object is the last object of the parent object to be restored from the tape storage system; and
- setting the parent object's state as "finalizing" if the object is not the last object of the parent object to be restored from the tape storage system.

23. A computing device associated with a distributed storage system, for asynchronously replicating data onto a tape medium, the computing device comprising:
- one or more processors; and
- memory storing one or more programs to be executed by the one or more processors;
- the one or more programs comprising instructions for:
  - receiving a first request from a client for storing an object within the tape storage system;
  - responsive to receiving the first request:
    - scheduling the object to be stored on the tape storage system asynchronously with respect to the first request; and
    - during the scheduling, acknowledging, to the first client, the first request as fulfilled;
    - wherein scheduling the object to be stored on the tape storage system asynchronously with respect to the first request includes:
      - storing the object within a staging sub-system of the distributed storage system, wherein the staging sub-system includes a plurality of objects scheduled to be transferred to the tape storage system;
      - transferring one or more objects from the staging sub-system to the tape storage system in accordance with a determination that a predefined condition is met, wherein the predefined condition is at least one of: the one or more objects have a storage size greater than a predefined storage size, and the one or more objects have been in the staging sub-system for a staging time greater than a predefined staging time; and
      - for a respective transferred object,
        - adding a reference to the object to a tape management sub-system of the tape storage system;
        - identifying a corresponding parent object associated with the object and its metadata within a parent object management sub-system of the distributed storage system, wherein the object is a replica of the identified parent object; and
        - updating the parent object's metadata to include the object's location within the tape storage system.

24. A computing device associated with a distributed storage system, for asynchronously replicating data from a tape medium, the computing device comprising:
- one or more processors; and
- memory storing one or more programs to be executed by the one or more processors;
- the one or more programs comprising instructions for:
  - receiving a first request from a client for restoring an object from the tape storage system to a destination storage sub-system of the distributed storage system;
  - responsive to receiving the first request:
    - scheduling the object to be restored from the tape storage system asynchronously with respect to the first request; and
    - during the scheduling, acknowledging, to the first client, the first request as fulfilled;
    - wherein scheduling the object to be restored from the tape storage system asynchronously with respect to the first request includes:
      - generating an object restore entry that identifies the object to be restored and the destination storage sub-system;
      - storing the object restore entry within a staging sub-system of the distributed storage system, wherein the staging sub-system includes a plurality of object restore entries scheduled to be applied to the tape storage system;
      - applying one or more object restore entries within the staging sub-system to the tape storage system in accordance with a determination that a predefined condition is met, wherein the predefined condition is at least one of: one or more objects to be restored have a storage size greater than a predefined storage size, and the one or more objects have been in the staging sub-system for a staging time greater than a predefined staging time; and
      - for a respective restored object,
        - transferring the object to the destination storage sub-system;
        - identifying a corresponding parent object associated with the object and its metadata within a parent object management sub-system of the distributed storage system, wherein the object is a replica of the identified parent object; and
        - updating the parent object's metadata to identify the object's location within the destination storage sub-system.

25. A non-transitory computer readable storage medium storing one or more programs configured for execution by a computing device associated with a distributed storage system, for asynchronously replicating data onto a tape medium, the one or more programs comprising instructions for:
- receiving a first request from a client to store an object within the tape storage system;
- responsive to receiving the first request:
  - scheduling the object to be stored on the tape storage system asynchronously with respect to the first request; and
  - during the scheduling, acknowledging, to the first client, the first request as fulfilled;
  - wherein scheduling the object to be stored on the tape storage system asynchronously with respect to the first request includes:
    - storing the object within a staging sub-system of the distributed storage system, wherein the staging sub-system includes a plurality of objects scheduled to be transferred to the tape storage system;
    - transferring one or more objects from the staging sub-system to the tape storage system in accordance with a determination that a predefined condition is met, wherein the predefined condition is at least one of: the one or more objects have a storage size greater than a predefined storage size, and the one or more objects have been in the staging sub-system for a staging time greater than a predefined staging time; and for a respective transferred object,
- adding a reference to the object to a tape management sub-system of the tape storage system;
- identifying a corresponding parent object associated with the object and its metadata within a parent object management sub-system of the distributed storage system, wherein the object is a replica of the identified parent object; and
- updating the parent object's metadata to include the object's location within the tape storage system.

26. A non-transitory computer readable storage medium storing one or more programs configured for execution by a computing device associated with a distributed storage system, for asynchronously replicating data from a tape medium, the one or more programs comprising instructions for:

receiving a first request from a client for restoring an object from the tape storage system to a destination storage sub-system of the distributed storage system;

responsive to receiving the first request:
- scheduling the object to be restored from the tape storage system asynchronously with respect to the first request; and
- during the scheduling, acknowledging, to the first client, the first request as fulfilled;
- wherein scheduling the object to be restored from the tape storage system asynchronously with respect to the first request includes:
  - generating an object restore entry that identifies the object to be restored and the destination storage sub-system;
  - storing the object restore entry within a staging sub-system of the distributed storage system, wherein the staging sub-system includes a plurality of object restore entries scheduled to be applied to the tape storage system;

applying one or more object restore entries within the staging sub-system to the tape storage system in accordance with a determination that a predefined condition is met, wherein the predefined condition is at least one of: one or more objects to be restored have a storage size greater than a predefined storage size, and the one or more objects have been in the staging sub-system for a staging time greater than a predefined staging time; and for a respective restored object,
- transferring the object to the destination storage sub-system;
- identifying a corresponding parent object associated with the object and its metadata within a parent object management sub-system of the distributed storage system, wherein the object is a replica of the identified parent object; and
- updating the parent object's metadata to identify the object's location within the destination storage sub-system.

* * * * *

UNITED STATES PATENT AND TRADEMARK OFFICE
CERTIFICATE OF CORRECTION

| | | |
|---|---|---|
| PATENT NO. | : 8,874,523 B2 | Page 1 of 1 |
| APPLICATION NO. | : 13/023498 | |
| DATED | : October 28, 2014 | |
| INVENTOR(S) | : Vickrey et al. | |

It is certified that error appears in the above-identified patent and that said Letters Patent is hereby corrected as shown below:

In the claims,

Claim 26, col. 29, line 21, please delete "for restoring" and insert --to restore--.

Signed and Sealed this
Twenty-fourth Day of February, 2015

Michelle K. Lee
*Deputy Director of the United States Patent and Trademark Office*